United States Patent
Han et al.

(10) Patent No.: US 7,899,405 B2
(45) Date of Patent: Mar. 1, 2011

(54) APPARATUS AND METHOD FOR TRANSMITTING/RECEIVING DATA IN A MOBILE COMMUNICATION SYSTEM USING MULTIPLE ANTENNAS

(75) Inventors: Jin-Kyu Han, Suwon-si (KR);
Dae-Gyun Kim, Seongnam-si (KR);
Hwan-Joon Kwon, Hwaseong-si (KR);
Dong-Hee Kim, Yongin-si (KR);
Youn-Sun Kim, Seongnam-si (KR);
Yu-Chul Kim, Suwon-si (KR); Cheol Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/654,858

(22) Filed: Jan. 6, 2010

(65) Prior Publication Data
US 2010/0111211 A1 May 6, 2010

Related U.S. Application Data

(63) Continuation of application No. 11/442,317, filed on May 30, 2006.

(30) Foreign Application Priority Data
May 30, 2005 (KR) ................................ 2005-45834

(51) Int. Cl.
*H04B 1/00* (2006.01)
*H04B 7/00* (2006.01)

(52) U.S. Cl. ..................... 455/69; 455/63.1; 455/67.13; 455/67.16; 455/562.1; 455/101; 455/277.1; 375/267; 375/347; 375/299; 370/320; 370/334; 370/343; 370/349; 370/335

(58) Field of Classification Search .................. 455/69, 455/67.11, 67.13, 63.1, 67.16, 562.1, 101, 455/277.1
See application file for complete search history.

(56) References Cited

U.S. PATENT DOCUMENTS 5,634,199 A 5/1997 Gerlach et al.

(Continued)

FOREIGN PATENT DOCUMENTS

EP 1207645 5/2002

(Continued)

OTHER PUBLICATIONS

Kei Ji et al., "MIMO Channel Transmission with Antenna Selection and Optimum Power Allocation", Proceedings for The Institute of Electronics, Information and Communication Engineers, p. 622, B-5-163, Mar. 3, 2003.

*Primary Examiner*—Marceau Milord
(74) *Attorney, Agent, or Firm*—Roylance, Abrams, Berdo & Goodman, L.L.P.

(57) ABSTRACT

An apparatus and method for transmitting/receiving data in a mobile communication system using multiple antennas are provided. A receiver estimates a fading channel of received data, selects a weight set relative to a maximum data transmission rate from at least one weight set with elements of a plurality of orthogonal weight vectors, and transmits feedback information including the selected weight set and channel-by-channel state information to a transmitter. The transmitter demultiplexes data to be transmitted on a basis of the feedback information into at least one sub-data stream, multiplies each sub-data stream by an associated weight, and transmits the data.

20 Claims, 13 Drawing Sheets

U.S. PATENT DOCUMENTS

| | | | |
|---|---|---|---|
| 6,665,545 B1 | 12/2003 | Raleigh et al. | |
| 6,687,492 B1 | 2/2004 | Sugar et al. | |
| 6,927,728 B2 * | 8/2005 | Vook et al. | 342/377 |
| 6,956,838 B2 | 10/2005 | Ertel et al. | |
| 6,963,742 B2 | 11/2005 | Boros et al. | |
| 6,965,762 B2 | 11/2005 | Sugar et al. | |
| 7,092,737 B2 * | 8/2006 | Horng et al. | 455/562.1 |
| 7,139,328 B2 * | 11/2006 | Thomas et al. | 375/299 |
| 7,167,526 B2 | 1/2007 | Liang et al. | |
| 7,248,638 B1 * | 7/2007 | Banister | 375/267 |
| 7,263,132 B2 | 8/2007 | Horng et al. | |
| 7,286,855 B2 | 10/2007 | Raleigh et al. | |
| 7,327,983 B2 | 2/2008 | Mehta et al. | |
| 7,339,980 B2 | 3/2008 | Grant et al. | |
| 7,483,675 B2 * | 1/2009 | Kent et al. | 455/67.11 |
| 7,542,446 B2 * | 6/2009 | Mehta et al. | 370/330 |
| 7,545,778 B2 * | 6/2009 | Sugar et al. | 370/335 |
| 7,548,592 B2 * | 6/2009 | Wight | 375/299 |
| 7,656,842 B2 * | 2/2010 | Thomas et al. | 370/334 |
| 7,675,988 B2 * | 3/2010 | Kim et al. | 375/267 |
| 7,738,595 B2 * | 6/2010 | Wight | 375/299 |
| 7,738,925 B2 * | 6/2010 | Nguyen et al. | 455/562.1 |
| 2004/0157646 A1 | 8/2004 | Raleigh et al. | |
| 2005/0129137 A1 * | 6/2005 | Yamada et al. | 375/267 |

FOREIGN PATENT DOCUMENTS

| | | |
|---|---|---|
| EP | 1445886 | 8/2004 |
| KR | 2002/0000456 | 1/2002 |
| KR | 2002/0014774 | 2/2002 |
| KR | 2004/0074340 | 8/2004 |
| WO | WO 03/075396 | 9/2003 |
| WO | WO 2004/014013 | 2/2004 |
| WO | WO 2004/040833 | 5/2004 |
| WO | WO 2005/008831 | 1/2005 |
| WO | WO 2005/036799 | 4/2005 |

* cited by examiner

APPARATUS AND METHOD FOR TRANSMITTING/RECEIVING DATA IN A MOBILE COMMUNICATION SYSTEM USING MULTIPLE ANTENNAS

CROSS-REFERENCE TO RELATED APPLICATIONS

This application is a continuation of U.S. patent application Ser. No. 11/442,317, filed on May 30, 2006, now pending, which in turns claims priority under 35 U.S.C. §119 to application Serial No. 2005-45834 filed in the Korean Intellectual Property Office on May 30, 2005, the entire disclosure of which is hereby incorporated by reference.

BACKGROUND OF THE INVENTION

1. Field of the Invention

The present invention generally relates to an apparatus and method for transmitting/receiving data in a mobile communication system. More particularly, the present invention relates to a data transmission/reception apparatus and method for implementing a spatial multiplexing transmission in a mobile communication system using multiple transmit/receive antennas.

2. Description of the Related Art

Mobile communication systems are developing into high-speed, high-quality wireless data packet communication systems for providing a data service and a multimedia service as well as a voice service. For example, the standardization for High-Speed Downlink Packet Access (HSDPA) ongoing in the 3rd Generation Partnership Project (3GPP) and the standardization for 1x Evolution Data and Voice (1xEV-DV) ongoing in the 3rd Generation Partnership Project 2 (3GPP2) can be regarded as evidence of the effort for finding a high-quality wireless data packet transfer service at more than 2 Mbps in the 3G mobile communication system. On the other hand, the $4^{th}$ generation (4G) mobile communication system serves to provide a higher-speed, higher-quality multimedia service.

To provide a high-speed, high-quality data service in wireless communication, a spatial multiplexing transmission scheme has been proposed which exploits a Multiple-Input Multiple-Output (MIMO) antenna system with multiple antennas in transmitting and receiving stages. The spatial multiplexing transmission scheme simultaneously transmits different data streams on a transmit antenna-by-transmit antenna basis. It is known that the possible service data capacity linearly increases in proportion to the number of transmit/receive antennas as the number of transmit/receive antennas increases without an increase in an additional frequency bandwidth theoretically.

When fading between the transmit/receive antennas is independent, the spatial multiplexing transmission scheme provides high capacity in proportion to the number of transmit/receive antennas. The capacity is significantly reduced in an environment with a high spatial correlation of fading rather than an independent fading environment. This is because fading from which signals transmitted from the transmit antennas suffer is similar and therefore it is difficult for the receiving stage to spatially distinguish a signal. Possible transmission capacity is affected by a Signal to Noise Ratio (SNR). As the received SNR decreases, the transmission capacity decreases. Thus, a transmission data rate can be maximized when the number of data streams to be simultaneously transmitted and a transmission rate of each data stream are adjusted according to radio channel states, in other words a spatial correlation of fading and a received SNR. If a transmission rate of data to be transmitted exceeds the transmission capacity supportable by a radio channel, many errors occur due to interference between data streams to be simultaneously transmitted and an actual data transmission rate decreases.

To increase a transmission data rate in the spatial multiplexing transmission scheme, profound research on a precoding scheme has been conducted. The precoding scheme multiplies data streams to be transmitted from a transmitter by transmission weights and transmits the data streams using information about a downlink channel from the transmitter to a receiver. Thus, the transmitter is to know a state of a downlink channel from each transmit antenna of the transmitter to each receive antenna of the receiver. For this, the receiver is to estimate the downlink channel state and feed back information about the downlink channel state estimated through a feedback channel. However, the receiver is to transmit a large quantity of feedback data using an uplink feedback channel in order to feed back the downlink channel state information. When a large amount of feedback data is to be transmitted, much time is taken to feed back the downlink channel state information from the receiver to the transmitter using the uplink feedback channel whose bandwidth is limited. The conventional precoding scheme cannot be applied to an instantaneously varying wireless channel environment. Accordingly, a real need exists for technology for maximizing a data transmission rate by precoding while minimizing an amount of feedback data needed to be transmitted from the receiver to the transmitter.

A precoder codebook scheme has been proposed as the conventional technology for reducing an amount of feedback information. In the precoder codebook scheme, the receiver selects a precode with the maximum transmission rate from among candidate precodes of a precoder codebook constructed by a limited number of precodes known to the transmitter and the receiver, and feeds back an index of the selected precode to the transmitter. The transmitter sends data using a precode mapped to the fed-back index in the precoder codebook. For example, when 4-bit feedback information is used, a precoder codebook constructed by a maximum of $2^4$ (=16) precodes is preset between the transmitter and the receiver. Because fading varies with time, the precode decision process is to be repeated in every time slot, such that the selected precode index is fed back to the transmitter in every time slot.

In comparison with the precoding scheme using the feedback channel state information, the precoder codebook scheme requires a smaller amount of feedback information. Assuming that the number of transmit antennas and the number of receive antennas are $n_T$ and $n_R$ in the MIMO antenna system, respectively, a total of $n_T \times n_R$ complex channel coefficients must be fed back when the channel state information is fed back. When Q bits are required to indicate one complex channel coefficient, a total of $n_T \times n_R \times Q$ bits are required. On the other hand, the precoder codebook scheme requires $\lceil \log_2 K \rceil$ bits when the number of precodes for providing a sufficient data rate is K, where $\lceil x \rceil$ is an integer equal to or more than x. In the precoding scheme using the channel state information, an amount of feedback information increases in proportion to a product of the number of transmit antennas and the number of receive antennas. However, in the precoder codebook scheme, an amount of feedback information depends on the number of precodes contained in the precoder codebook, in other words a size of the precoder codebook.

The precoder codebook scheme is to include, in the codebook, ready-made precodes quantized in all possible cases at a spatial multiplexing transmission time. The precoder codebook scheme can reduce an amount of feedback information using predefined precodes, and can also reduce the degree of freedom in a precoding matrix. When the number of factors to be considered is large, the degree of freedom in the precoding matrix significantly increases the number of preset precodes, such that a size of the precoder codebook increases. In the following two cases, a size of the precoder codebook significantly increases.

First, the number of precodes to be considered increases at the ratio of geometrical progression because all precodes are to be considered according to a spatial correlation of a channel for an application in a channel environment with various spatial correlations. An optimal precoder codebook differs according to a spatial correlation of a channel. In the conventional precoder codebook technology, the precoder codebook is designed under the assumption that a fading channel does not have a spatial correlation. However, a distribution of valid eigenvalues, in other words eigenvectors whose eigenvalues are large, differs, and therefore optimal precodes differ, according to the spatial correlation of the fading channel. As a result, a large number of precoder codebooks optimized according to the spatial correlation of the fading channel are to be used to achieve a high data transmission rate.

Second, the number of precodes to be considered increases at the ratio of geometrical progression because all precodes are to be considered according to the number of data streams to be simultaneously transmitted when the number of data streams to be simultaneously transmitted is adjusted according to a channel environment. The number of data streams to be simultaneously transmitted varies from 1 to a maximum of min $(n_T,n_R)$ (indicative of a minimum value between the number of transmit antennas and the number of receive antennas). The number of columns of a precode matrix is to be varied according to the number of data streams to be simultaneously transmitted. Because column vectors for constructing the precode matrix serving as weight vectors are multiplied by data streams, the number of column vectors of the precode matrix is to match the number of data streams to be simultaneously transmitted. For example, when both the number of transmit antennas and the number of receive antennas are 4, the number of data streams capable of being simultaneously transmitted varies from 1 to 4. There must be considered precodes in which the number of column vectors is 1, precodes in which the number of column vectors is 2, precodes in which the number of column vectors is 3, and precodes in which the number of column vectors is 4. When the maximum number of data streams capable of being simultaneously transmitted increases as the number of transmit/receive antennas increases, a significantly increased amount of feedback information is required according to an increased number of precodes to be considered. Thus, it is difficult for the precoder codebook scheme to be applied to the spatial multiplexing transmission scheme for obtaining the maximum transmission rate in an associated channel environment by varying a transmission data rate and the number of data streams to be simultaneously transmitted according to the channel environment. In the precoder codebook scheme using a set of predefined precodes as described above, a size of a precoder codebook increases according to the number of transmit antennas and the number of data streams to be simultaneously transmitted, such that its actual application may be difficult.

The number of antennas may be different between receivers communicating with one transmitter. For example, when the number of base station antennas is 4 and the number of mobile station antennas is 1, 2, 3, or 4 according to a terminal type, the maximum number of sub-data streams capable of being transmitted becomes 1, 2, 3, or 4. When the precoder codebook technology is applied, each precoder codebook based on the number of all available receiver antennas and a feedback channel based on each precoder codebook must be defined. The receivers are to select and use a precoder codebook based on the number of antennas of an associated receiver and a feedback channel based on the precoder codebook. A process for defining a precoder codebook and feedback information to be used between a transmitter and a receiver is required. Thus, a flexible precoding scheme applicable to various transmit/receive antenna structures is required.

Accordingly, there is a need for an improved and efficient precoding scheme and a feedback scheme that can be applied to a spatial multiplexing transmission scheme for adjusting the number of data streams to be simultaneously transmitted in a channel environment with various spatial correlations and can provide a high data transmission rate with a significantly small amount of feedback information.

SUMMARY OF THE INVENTION

Exemplary embodiments of the present invention address at least the above problems and/or disadvantages and provide at least the advantages described below. Accordingly, it is, therefore, an object of the present invention to provide an apparatus and method for transmitting/receiving data that can efficiently provide a data transmission rate according to a channel environment in a mobile communication system using multiple transmit/receive antennas.

It is another object of the present invention to provide an apparatus and method for transmitting/receiving data that can provide a high data transmission rate with a small amount of feedback information in a mobile communication system using multiple transmit/receive antennas.

In accordance with an exemplary aspect of the present invention, there is provided a mobile communication system using multiple antennas, comprising a receiver for estimating a fading channel of received data, selecting a weight set relative to a maximum data transmission rate from at least one weight set with elements of a plurality of orthogonal weight vectors, and transmitting feedback information including the selected weight set and channel-by-channel state information to a transmitter, and the transmitter for demultiplexing data to be transmitted on a basis of the feedback information into at least one sub-data stream, multiplying each sub-data stream by an associated weight, and transmitting the data.

An exemplary receiver may comprise a downlink channel estimator for estimating a channel state using a pilot channel of the data transmitted from the transmitter, a weight selector for deciding the weight set and weight vectors on a basis of the channel state, and transmitting information about the weight set and the weight vectors to the transmitter, and a subchannel-by-subchannel state estimator for estimating channel states of sub-data streams according to the decided weight vectors and transmitting only information about the channel states of the sub-data streams to the transmitter.

An exemplary receiver may comprise a downlink channel estimator for estimating a channel state using a pilot channel of the data transmitted from the transmitter; a weight selector for deciding the weight set and weight vectors on a basis of the channel state, and transmitting the decided weight set and the decided weight vectors to the transmitter and a subchannel-by-subchannel state estimator for estimating channel states of all weight vectors of the decided weight set and transmitting information about the estimated channel states to the transmitter.

An exemplary subchannel-by-subchannel state estimator transmits information about a "No Transmission" state for an unused channel on a basis of the decided weight vectors.

An exemplary transmitter comprises a demultiplexer for demultiplexing a main data stream to be transmitted into the at least one sub-data stream, at least one channel encoder and modulator for receiving the at least one sub-data stream and independently performing channel coding and modulation processes for the at least one sub-data stream according to a channel coding rate and a modulation scheme, a beamformer for multiplying the at least one channel-coded and modulated sub-data stream by a weight and transmitting the data to the receiver, and a controller for deciding in advance the number of sub-data streams, the coding rate of the at least one sub-data stream, the modulation scheme, and a weight to be multiplied by each sub-data stream on a basis of the feedback information transmitted from the receiver.

The feedback information may comprise weight set index information for indicating the selected weight set, weight vector information for indicating weight vectors selected from the selected weight set, and channel state information of the at least one sub-data stream.

The transmitter and the receiver may store in advance weight sets and weight vectors according to the number of transmit antennas, the number of receive antennas, and the number of weight sets.

In accordance with another exemplary aspect of the present invention, there is provided a method for transmitting/receiving data in a mobile communication system using multiple antennas, comprising a) estimating a fading channel from a pilot channel of received data in a receiver, b) selecting a weight set relative to a maximum data transmission rate from at least one weight set with elements of a plurality of orthogonal weight vectors on a basis of the estimated fading channel, c) estimating channel-by-channel state information relative to the selected weight set, d) transmitting feedback information comprising the selected weight set and the channel-by-channel state information to a transmitter, and e) transmitting antenna-by-antenna data to be transmitted on a basis of the feedback information.

The designing the weight set may comprise deciding a plurality of weight vectors with a phase difference defined according to the number of transmit antennas and the number of weight sets and configuring the weight set with orthogonal weight vectors among the decided weight vectors.

The phase difference may be computed by $$\frac{2\pi}{N \cdot n_T},$$

where N is the number of weight sets and $n_T$ is the number of transmit antennas.

The designing the weight set may comprise f-1) deciding a plurality of orthogonal weight vectors among a number of weight sets, and f-2) repeating f-1) a number of times corresponding to the number of weight sets.

The f-1) may comprise deciding a reference phase for orthogonal elements of a decided weight vector, and deciding elements with a difference of the reference phase from a first element of the weight vector.

The feedback information may comprise weight set index information for indicating the selected weight set, weight vector information for indicating a weight vectors selected from the selected weight set, and channel state information of at least one sub-data stream.

The feedback information may comprise weight set index information for indicating the selected weight set, and channel state information of all sub-data streams relative to the selected weight set.

The e) may comprise: demultiplexing a main data stream to be transmitted into at least one sub-data stream on the basis of the feedback information, independently performing channel coding and modulation processes for the at least one sub-data stream according to a channel coding rate and a modulation scheme defined on the basis of the feedback information, and multiplying the at least one channel-coded and modulated sub-data stream by a weight defined on the basis of the feedback information and transmitting the data to the receiver.

In accordance with another exemplary aspect of the present invention, there is provided a mobile communication system using multiple antennas, comprising a receiver for estimating a fading channel of received data, applying at least one weight set with elements of a plurality of orthogonal weight vectors in a time period, deciding weight vectors relative to a maximum data transmission rate for the at least one weight set to be used at a time point, and transmitting feedback information comprising channel-by-channel state information and the decided weight vectors to a transmitter, and the transmitter for receiving the feedback information, demultiplexing data, to be transmitted on a basis of the weight vectors of the weight set to be applied in the time period, into at least one sub-data stream, multiplying the at least one sub-data stream by an associated weight, and transmitting the data.

The receiver comprises a downlink channel estimator for estimating a channel state using a pilot channel of the data transmitted from the transmitter, a weight selector for deciding information about the weight vectors of the weight set to be applied in the time period on a basis of the channel state and transmitting the decided weight vector information to the transmitter, and a subchannel-by-subchannel state estimator for estimating channel states of the decided weight vectors and transmitting information about the estimated channel states to the transmitter.

The transmitter comprises a demultiplexer for demultiplexing a main data stream to be transmitted into at least one sub-data stream, at least one channel encoder and modulator for receiving the at least one sub-data stream and independently performing channel coding and modulation processes for the at least one sub-data stream according to a channel coding rate and a modulation scheme, a beamformer for multiplying the at least one channel-coded and modulated sub-data stream by a weight and transmitting the data to the receiver, and a controller for deciding in advance the number of sub-data streams, the coding rate of the at least one sub-data stream, the modulation scheme, and a weight to be multiplied by each sub-data stream on a basis of the feedback information transmitted from the receiver when the weight set is applied.

The transmitter and the receiver may store in advance weight sets and weight vectors according to the number of transmit antennas, the number of receive antennas, and the number of weight sets.

In accordance with yet another exemplary aspect of the present invention, there is provided a method for transmitting/receiving data in a mobile communication system using multiple antennas, the method comprising estimating a fading channel from a pilot channel of received data in a receiver, applying at least one weight set with elements of a plurality of orthogonal weight vectors in a time period on a basis of the estimated fading channel and deciding weight vectors relative to a maximum data transmission rate for the at least one weight set to be used at a time point, estimating channel-bychannel state information relative to the decided weight vectors, transmitting feedback information comprising the decided weight vectors and the channel-by-channel state information to a transmitter, and receiving the feedback information and transmitting antenna-by-antenna data according to the weight vectors of the weight set to be applied in the time period.

BRIEF DESCRIPTION OF THE DRAWINGS

The above and other objects and aspects of the present invention will be more clearly understood from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Exemplary embodiments of the present invention will be described in detail herein below with reference to the accompanying drawings. In the following description, details are provided for a better understanding of the present invention. In the following description, detailed descriptions of functions and configurations incorporated herein that are well known to those skilled in the art are omitted for clarity and conciseness.

The present invention proposes an apparatus and method in which a transmitter receives and efficiently uses a receiver's feedback information according to a spatial correlation in a system with multiple transmit/receive antennas.

In the system using the multiple transmit/receive antennas in the exemplary embodiments of the present invention, the receiver selects a weight set relative to a maximum data transmission rate from a plurality of weight sets, selects weights of the weight set, and transmits selection information through an uplink feedback channel to the transmitter. The transmitter constructs a precoding matrix using the information transmitted through the feedback channel from the receiver. Herein, the information may be an index of the weight set, weight vector information corresponding to information about weights selected from the weight set, and channel state information of respective sub-data streams. In the exemplary embodiments of the present invention, the information including the index of the weight set, the weight vector information corresponding to the information about the weights selected from the weight set, and the channel state information of the respective sub-data streams is defined as the feedback information. The technology proposed in the present invention is referred to as the knockdown precoding technology.

Next, a system and feedback information generation method in accordance with the present invention will be described with reference to the exemplary embodiments.

1. First Exemplary Embodiment

1) Knockdown Precoding System

The present invention considers a system of multiple transmit/receive antennas in which a transmitter has a transmit antenna array in which $n_T$ antennas are arrayed and a receiver has a receive antenna array in which $n_R$ antennas are arrayed. Multiple weight sets are predefined between the transmitter and the receiver. The weight set is a set of weight vector elements whose number corresponds to the number of transmit antennas. When N weight sets are decided, a total of $N \times n_T$ weight vectors are decided.

In the knockdown precoding technology, the receiver selects a weight set relative to a maximum data transmission rate from a plurality of weight sets, selects weights from the weight set, and transmits selection information through an uplink feedback channel to the transmitter. The transmitter constructs a precoding matrix using the transmitted information.

Figure 1:
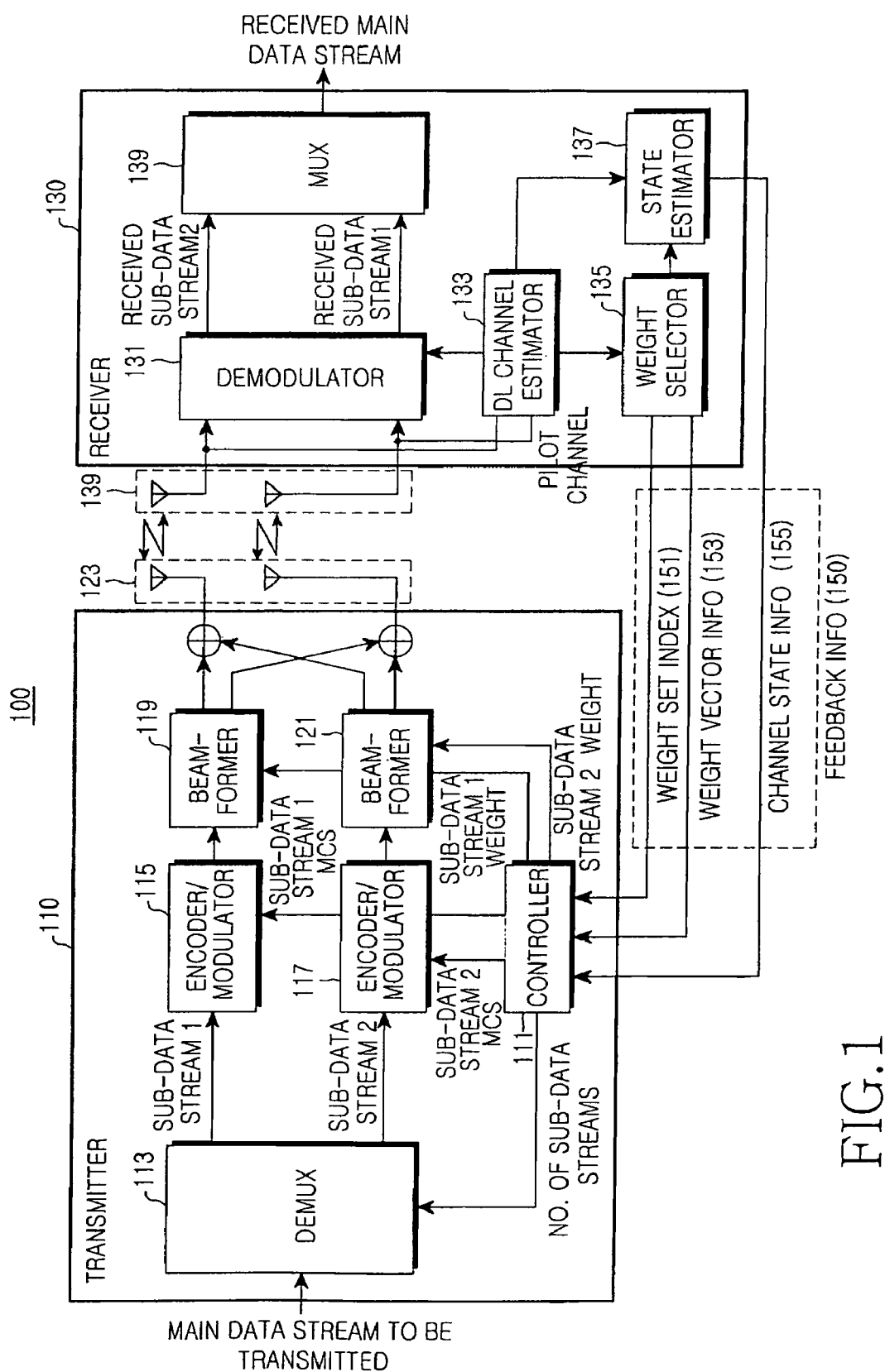
FIG. 1 illustrates a system in accordance with a first exemplary embodiment of the present invention.

FIG. 1 illustrates a system in accordance with a first exemplary embodiment of the present invention. For convenience of explanation, the first exemplary embodiment of the present invention corresponds to the case where the number of transmitter antennas and the number of receiver antennas are 2, respectively.

Referring to FIG. 1, a receiver 130 of a system 100 of the present invention is provided with a downlink (DL) channel estimator 133, a demodulator 131, a weight selector 135, a subchannel-by-subchannel state estimator 137, and a multiplexer (MUX) 139 according to functions. A transmitter 110 is provided with a controller 111, a demultiplexer (DEMUX) 113, channel encoders/modulators 115 and 117, and beamformers 119 and 121.

The downlink channel estimator 133 performs channel estimation using a pilot channel of a signal received from the transmitter 110 and transfers estimation information to the weight selector 135. The weight selector 135 generates weight sets and weight vectors of each weight set according to the number of antennas on the basis of the estimation information. The weight selector 135 transmits a weight set index 151 and weight vector information 153 to the transmitter 110. Simultaneously, the weight selector 135 transfers the information to the subchannel-by-subchannel state estimator 137. The subchannel-by-subchannel state estimator 137 estimates channel-by-channel states relative to a weight set selected according to the received information and transmits channel-by-channel state information to the transmitter 110.

The controller 111 of the transmitter 110 receives feedback information 150 from the receiver 130. The controller 111 controls the demultiplexer 113, the channel encoders 115 and 117, and the beamformers 119 and 121 using the feedback information 150. In detail, the controller 111 decides the number of sub-data streams using the feedback information 150 and notifies the demultiplexer 113 of the decided number of sub-data streams. The controller 111 decides a coding rate and a modulation scheme of each sub-data stream on the basis of channel state information 155 of each sub-data stream among feedback information 150 and notifies the channel encoders/modulators 115 and 117 of the decided coding rate and the decided modulation scheme. At a beamforming time, the controller 111 computes weights to be applied to the respective sub-data streams using a weight set index 151 or information 153 of weights selected from an associated weight set among the feedback information 150, and notifies the beamformers 119 and 121 of the computed weights.

The demultiplexer 113 demultiplexes a main data stream according to the number of sub-data streams transmitted from the controller 111. The channel encoders/modulators 115 and 117 independently encode and modulate sub-data streams obtained by demultiplexing the main data stream using information about the coding rate and the modulation scheme received from the controller 111. The beamformers 119 and 121 multiply the sub-data streams received from the channel encoders/modulators 115 and 117 by weights. The transmitter 110 computes a sum of the sub-data streams and transmits data through transmit antennas 123.

A method for transmitting data in a transmitter and a receiver of the system of the present invention will be described in detail with reference to FIGS. 2 and 3.

Figure 2:
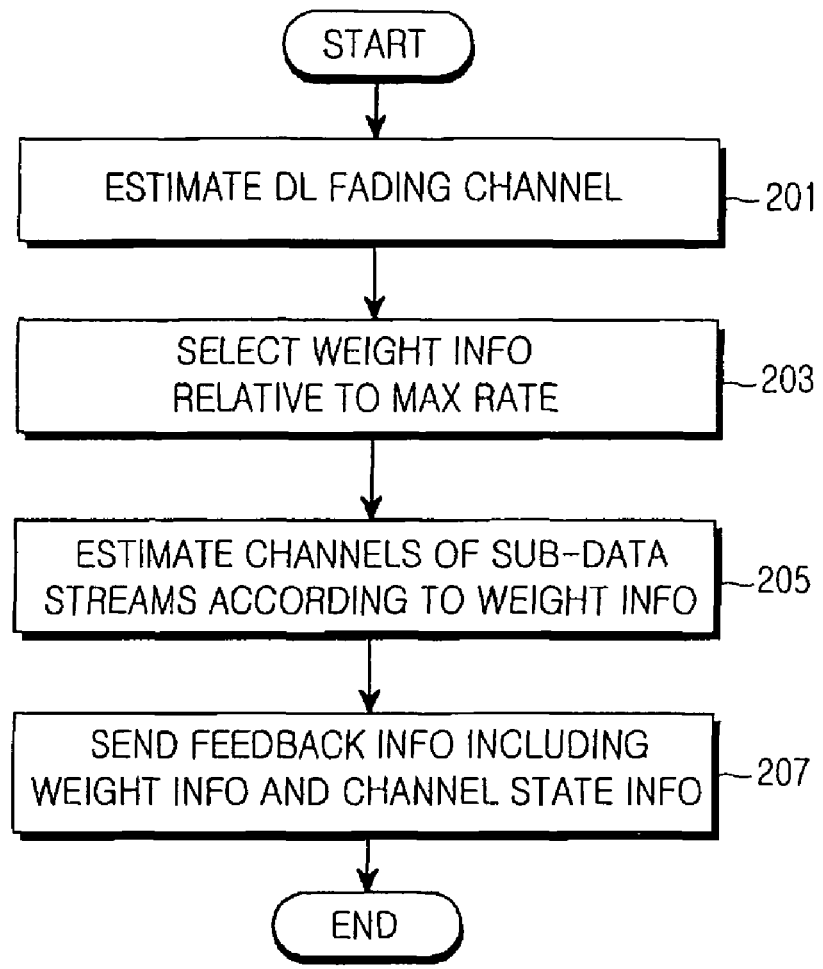
FIG. 2 is a flowchart illustrating a method for transmitting/receiving data in a receiver of the system in accordance with the first exemplary embodiment of the present invention.

FIG. 2 is a flowchart illustrating an exemplary method for transmitting/receiving data in the receiver 130 of the system of FIG. 1.

Referring to FIG. 2, the downlink channel estimator 133 of the receiver 130 estimates a downlink fading channel using a pilot channel or symbol received from multiple receive antennas 139 in step 201. That is, the downlink fading channel from each transmit antenna to each receive antenna is estimated. Subsequently, the weight selector 135 selects weight information relative to a maximum data transmission rate on the basis of information about the estimated fading channel in step 203. Herein, the weight information is a weight set index 151 and weight vector information 153.

Step 203 will be described in detail. Weight vectors relative to the maximum data transmission rate are selected from each of the N weight sets, and a possible transmission data rate based on the selected weight vectors is computed. That is, possible transmission data rates are compared between the N selected weight sets (or the weight sets with elements of weight vectors selected from the respective weight sets), and a weight set with the maximum data transmission rate is selected. A weight set index belonging to the weight set with the maximum transmission rate is decided and weights to be used to actually transmit weight vectors belonging to the weight set relative to the maximum transmission rate are decided.

The subchannel-by-subchannel state estimator 137 estimates channels of respective sub-data streams according to the weight information in step 205. That is, Signal to Interference Noise Ratios (SINRs) of the sub-data streams formed by the weights selected by the weight selector 135 are computed, and Modulation and Coding Selection (MCS) or channel state information of each sub-data stream is decided. Subsequently, the receiver 130 transmits the feedback information 150 including the weight information and the channel state information to the transmitter in step 207. Herein, the receiver can simultaneously or separately transmit elements of the feedback information.

Figure 3:
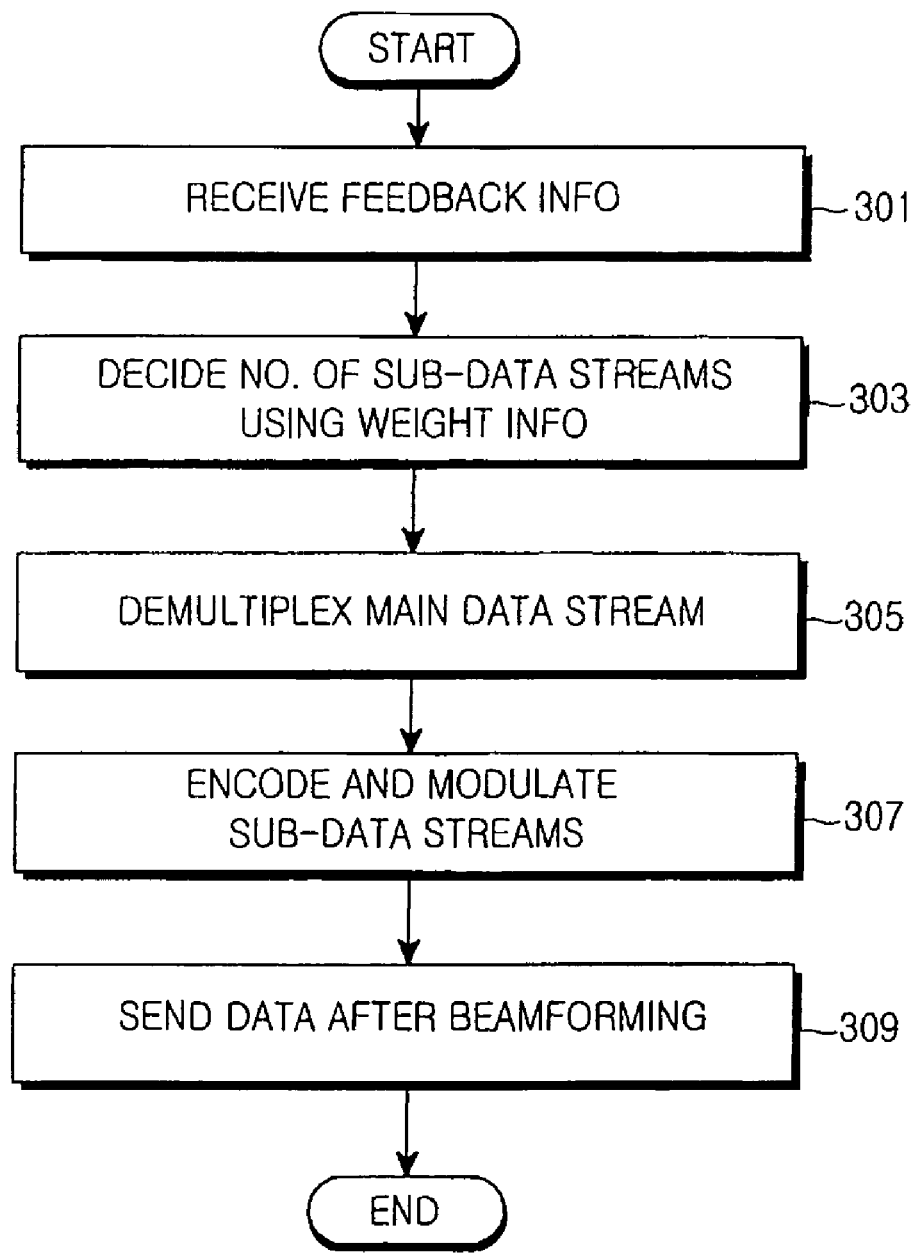
FIG. 3 is a flowchart illustrating a method for transmitting/receiving data in a transmitter of the system in accordance with the first exemplary embodiment of the present invention.

FIG. 3 is a flowchart illustrating an exemplary method for transmitting/receiving data in the transmitter 110 of the system of FIG. 1.

Referring to FIG. 3, the controller 111 of the transmitter 110 receives feedback information 150 from the receiver 130 in step 301. Subsequently, the controller 111 decides the number of sub-data streams capable of being finally transmitted using weight information of the feedback information 150 in step 303. Herein, the number of sub-data streams capable of being transmitted is equal to the number of selected weights.

The demultiplexer 113 demultiplexes a main data stream to be transmitted into sub-data streams whose number corresponds to the number of sub-data streams capable of being transmitted in step 305. Using information about a coding rate and a modulation scheme defined by the fed-back channel state information of the respective sub-data streams, the channel encoders/modulators 115 and 117 independently perform encoding and symbol mapping processes for the sub-data streams in step 307. Subsequently, the beamformers 119 and 121 multiply the sub-data streams by weights transferred from the controller 111 and transmit the sub-data streams through the transmit antennas 123 in step 309.

To feed back a precode constructed by weights relative to a maximum data transmission rate to the transmitter 110 in a process for obtaining a weight set and its weight vectors in an exemplary embodiment of the present invention, a feedback channel is required to transmit a selected weight set index 151 and weight vector information 153 about the weights selected from the selected weight set. N weight sets are designed by Equation (1). If the N weight sets are defined by the transmitter and receivers within a cell, the number of bits allocated to the feedback channel for feeding back the selected weight set index 151 is $\lfloor \log_2 N \rfloor$. Herein, $\lfloor x \rfloor$ is a minimum integer equal to or more than x.

When a scheme for indicating selection or non-selection of each weight belonging to a selected weight set is used for the weights selected from one weight set, 1-bit feedback information for each weight is required, such that feedback bits whose number corresponds to the total number of transmit antennas are required. An amount of feedback information required to feed back a precode is $\lfloor \log_2 N \rfloor + n_T$ bits/use. A feedback channel is additionally required to feed back channel state information of respective sub-data streams formed by weights estimated and selected by the subchannel-by-subchannel state estimator 137.

Next, a method for designing a weight set in accordance with an exemplary embodiment of the present invention will be described.

2) Weight Set Design for Knockdown Precoding Technology

The transmitter 110 and the receiver 130 define multiple weight sets. The weight set is a set of elements of weight vectors whose number corresponds to the number of transmit antennas, $n_T$. The weight vector may be referred to as the weight. Herein, one weight vector is constructed by $n_T$ complex elements. When N weight sets are defined, a total of ($N \times n_T$) weight vectors are constructed. When the N weight sets are designed, the following principles are used to consider a spatial correlation. First, $n_T$ weights belonging to one weight set are orthogonal to each other, and the magnitude of each weight is 1.

Second, main beam directions of beams formed by the total of ($N \times n_T$) weight vectors do not overlap with each other and are to be uniformly distributed within a service area.

To decide the total of N weight sets satisfying the first and second principles, the total of ($N \times n_T$) weight vectors in which a phase difference between elements neighboring to each weight vector is an integer multiple of $$\frac{2\pi}{N \cdot n_T}$$

are generated, the $n_T$ weights in which a phase difference between weight vector elements in the same position is an integer multiple of $$\frac{2\pi}{n_T}$$

are grouped in one weight set, and the total of N weight sets in which the $n_T$ weights belonging to the same weight set are orthogonal to each other are decided.

Figure 4:
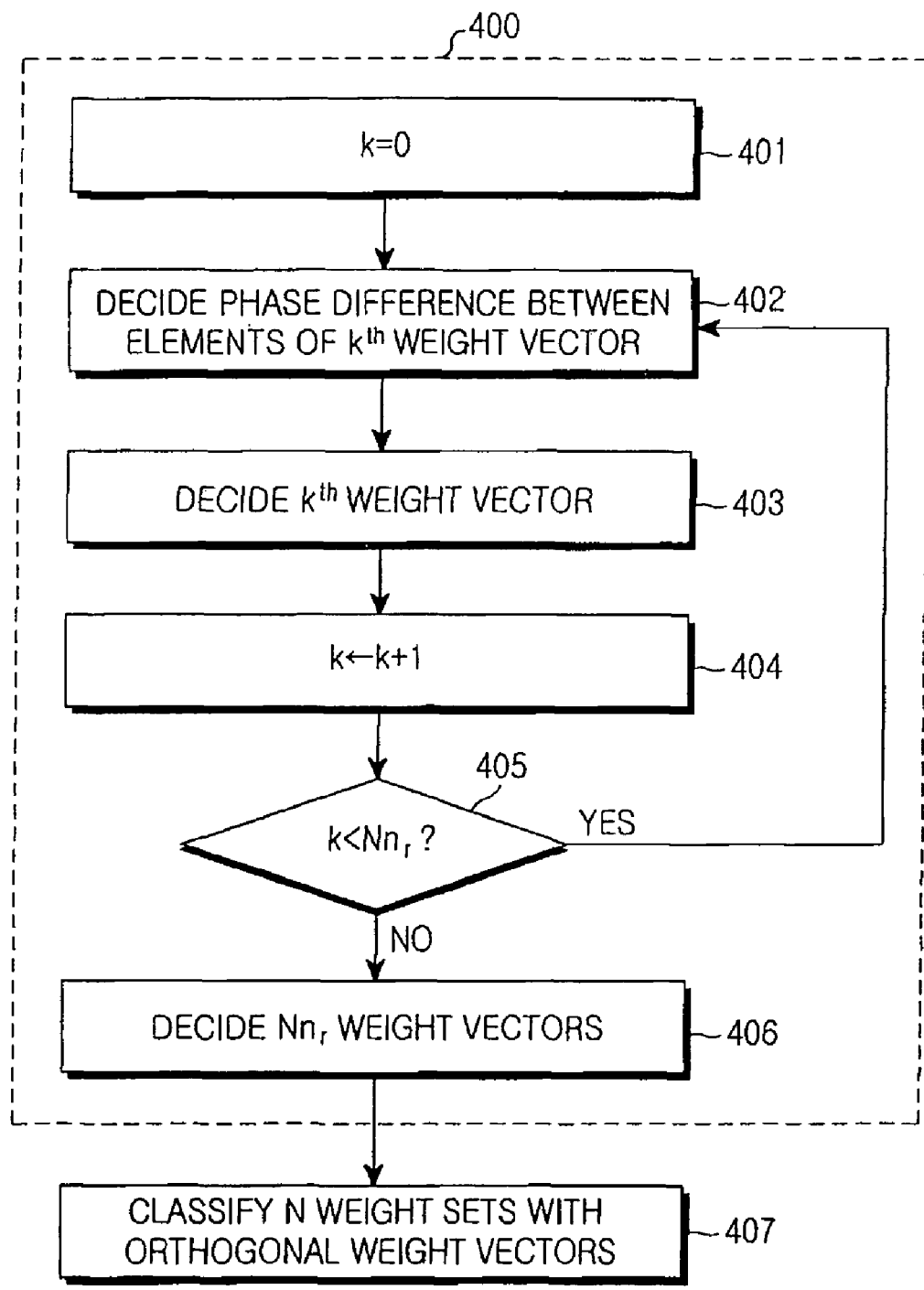
FIGS. 4 and 5 are flowcharts illustrating a method for deciding a weight set in the system of the present invention.

FIG. 4 illustrates an example of a process for deciding the total of N weight sets.

Referring to FIG. 4, ($N \times n_T$) weight vectors are generated in step 400. The number of weight sets, N, and the number of transmit antennas, $n_T$, are input. To compute the ($N \times n_T$) weight vectors, a cyclic process of steps 401~405 from k=0 to k=($N \times n_T$) is performed. In step 402, a phase difference $$\left(\Delta_k = \frac{2\pi k}{N n_T}\right)$$

between neighbor elements within a weight vector is computed in order to compute the k-th weight vector. In step 403, the k-th weight vector is decided using the computed phase difference. The first element of the k-th weight vector is $$\frac{1}{\sqrt{n_T}},$$

the second element is $$\frac{1}{\sqrt{n_T}} \exp(j \Delta_k)$$

with a phase of $\Delta_k$, in other words $$\frac{1}{\sqrt{n_T}} \exp\left(j \frac{2\pi k}{N n_T}\right),$$

and the third element is $$\frac{1}{\sqrt{n_T}} \exp(j 2 \Delta_k)$$

with a phase that is $\Delta_k$ more than that of the second element, in other words $$\frac{1}{\sqrt{n_T}} \exp\left(j \frac{4\pi k}{N n_T}\right).$$

When all the $n_T$ elements are filled in the above-described method, the k-th weight vector is completed. After the k-th weight vector is decided, k is incremented by 1 in step 404. When steps 402 and 403 are repeated, the (k+1)-th weight vector is decided. After all the ($N \times n_T$) weight vectors are decided in step 406, only orthogonal weight vectors are collected and are classified into the weight sets in step 407. A classification criterion is to collect $n_T$ weights in which a phase difference between weight vector elements in the same position is an integer multiple of $$\frac{2\pi}{n_T}$$

in one weight set. When the weight sets are classified such that the criterion is satisfied, Weight Set 1 is constructed by k-th weight vectors where k=0, N, 2N, . . . , ($n_T$−1)N, and Weight Set 2 is constructed by k-th weight vectors where k=1, N+1, 2N+1, . . . , ($n_T$−1)N+1. In general expression, Weight Set (n+1) is constructed by k-th weight vectors where k=n, N+n, 2N+n, . . . , ($n_T$−1)N+n.

An example of a concrete design according to the above-described principles for designing weight sets is as follows. When N weight sets $\{E_n\}$ (n=1, L, N) are designed, each weight set $E_n$ is constructed by elements of $n_T$ orthogonal weight vectors $\{e_{n,i}\}$ (n=1, L, $n_T$). That is, $E_n = \{e_{n,1}, e_{n,2}, L, e_{n,n_T}\}$. Herein, $\{e_{n,i}\}$ denotes the i-th weight vector belonging to the n-th weight set $E_n$ and is designed as shown in Equation (1).

$$e_{n,i} = \frac{1}{\sqrt{n_T}} \begin{bmatrix} \omega_{1,i}^{(n)} \\ \vdots \\ \omega_{n_T,i}^{(n)} \end{bmatrix} = \frac{1}{\sqrt{n_T}} \begin{bmatrix} 1 \\ e^{j\frac{2\pi}{n_T}\left(\frac{n-1}{N}+(i-1)\right)} \\ e^{j2\frac{2\pi}{n_T}\left(\frac{n-1}{N}+(i-1)\right)} \\ \vdots \\ e^{j(n_T-1)\frac{2\pi}{n_T}\left(\frac{n-1}{N}+(i-1)\right)} \end{bmatrix} \quad \text{Equation (1)}$$

Herein, $\omega_{m,i}^{(n)}$ is expressed by Equation (2).

$$\omega_{m,i}^{(n)} = \exp\{j(m-1)\phi_{n,i}\} \exp\left\{j \frac{2\pi(m-1)}{n_T}\left(\frac{n-1}{N}+i-1\right)\right\} \quad \text{Equation (2)}$$

Herein, $$\phi_{n,i} = \left(\frac{2\pi}{n_T}\left(\frac{n-1}{N} + i - 1\right)\right)$$

denotes a reference phase of the i-th weight vector belonging to the n-th weight set $E_n$.

Figure 5:
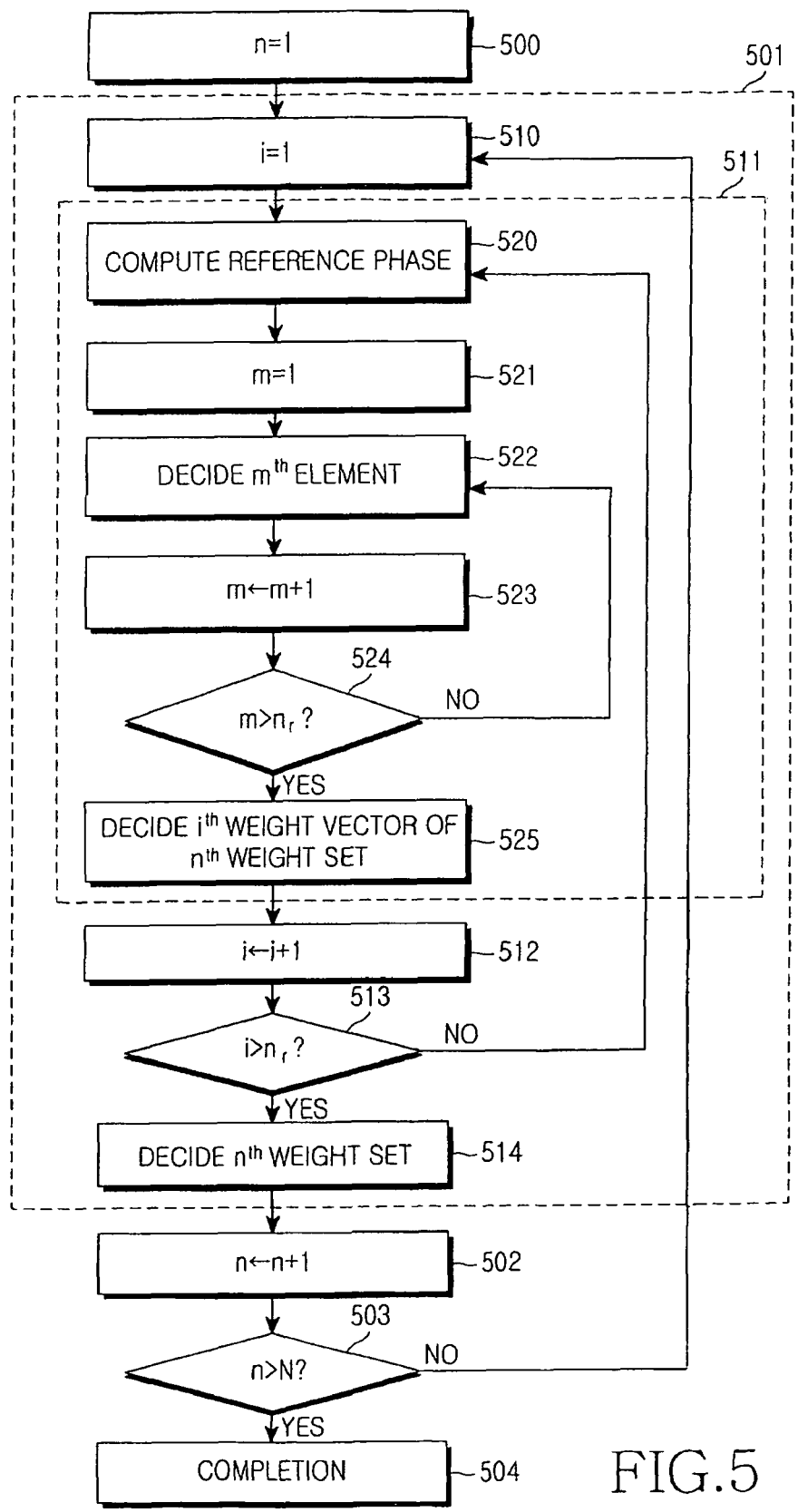

FIG. 5 is a flowchart illustrating another example of deciding a weight set in accordance with an exemplary embodiment of the present invention. Specifically, FIG. 5 illustrates a process for deciding a total of N weight sets according to Equation (1). First, a weight set number n is initialized to 1 in step 500. Because the n-th weight set is computed in step 501, the first weight set is computed immediately after step 500. In step 502, n is incremented by 1. Until all the N weight sets are completed, step 501 is repeated. When all the weight sets are completed, the process is ended in step 504.

In step 501, $n_T$ weight vectors within the n-th weight set are computed. In step 510, a weight vector number i of the n-th weight set is initialized to 1. In step 511, the i-th weight vector of the n-th weight set is decided. That is, the first weight vector of the n-th weight set is computed after step 510. In step 512, i is incremented by 1. Until a total of $n_T$ weight vectors within the n-th weight set are completed, step 511 is repeated. When all weight vectors of the n-th weight set are decided, the n-th weight set is completely decided in step 514. Then, a process for deciding the next weight set is performed.

In step 511, a process for computing the i-th weight vector of the n-th weight set is performed. In step 520, a reference phase $\phi_{n,i}$ is decided to compute the i-th weight vector of the n-th weight set. When the reference phase is decided, each element of the i-th weight vector within the n-th weight set is computed with a value of the reference phase. In step 521, an element number m is initialized to 1. In step 522, the m-th element of the i-th weight vector within the n-th weight set is computed by applying the reference phase computed in step 520 to $\omega_{m,i}^{(n)} = \exp\{j(m-1)\phi_{n,i}\}$. That is, the first element of the i-th weight vector within the n-th weight set is computed immediately after step 521. When this process is repeated from m=1 to m=$n_T$, the i-th weight vector within the n-th weight set is completed in step 525. Then, a process for deciding the next weight vector is performed.

When two weight sets are designed in a system of multiple transmit/receive antennas including four transmit antennas, they are expressed as shown in Equation (3).

$$E_1 = \{e_{1,1}, e_{1,2}, e_{1,3}, e_{1,4}\} = \left\{\frac{1}{2}\begin{bmatrix}1\\1\\1\\1\end{bmatrix}, \frac{1}{2}\begin{bmatrix}1\\e^{j\pi/2}\\e^{j\pi}\\e^{j3\pi/2}\end{bmatrix}, \frac{1}{2}\begin{bmatrix}1\\e^{j\pi}\\e^{j2\pi}\\e^{j3\pi}\end{bmatrix}, \frac{1}{2}\begin{bmatrix}1\\e^{j3\pi/2}\\e^{j3\pi}\\e^{j9\pi/2}\end{bmatrix}\right\}$$

$$E_2 = \{e_{2,1}, e_{2,2}, e_{2,3}, e_{2,4}\} = \left\{\frac{1}{2}\begin{bmatrix}1\\e^{j\pi/4}\\e^{j\pi/2}\\e^{j3\pi/4}\end{bmatrix}, \frac{1}{2}\begin{bmatrix}1\\e^{j3\pi/4}\\e^{j3\pi/2}\\e^{j9\pi/4}\end{bmatrix}, \frac{1}{2}\begin{bmatrix}1\\e^{j5\pi/4}\\e^{j5\pi/2}\\e^{j15\pi/4}\end{bmatrix}, \frac{1}{2}\begin{bmatrix}1\\e^{j7\pi/4}\\e^{j7\pi/2}\\e^{j21\pi/4}\end{bmatrix}\right\}$$

Equation (3)

Four weights belonging to $E_1$ of Equation (3) are orthogonal to each other and their magnitudes are 1. Also, four weights belonging to $E_2$ of Equation (3) are orthogonal to each other and their magnitudes are 1. However, $\{e_{1,i}\}$ (i=1, 2, 3, 4) and $\{e_{2,i}\}$ (i=1, 2, 3, 4) weights belonging to different weight sets are not orthogonal to each other. When data streams based on the orthogonal weights are transmitted, interference between the data streams to be simultaneously transmitted is minimized, such that a sum of transmission rates of the data streams to be simultaneously transmitted can be maximized. The exemplary knockdown precoding technology proposed in the present invention designs orthogonal weights belonging to one weight set and transmits data streams to be simultaneously transmitted according to weights selected from the one weight set, thereby reducing interference between the data streams to be simultaneously transmitted and maximizing a sum of transmission rates of the data streams to be simultaneously transmitted. Main beams/lobes formed by 8 weights belonging to $E_1$ and $E_2$ do not overlap with each other and are uniformly distributed within a service area. Accordingly, even though receivers randomly distributed in the service area of the transmitter are located in any direction, beamforming gain is obtained by one or more weights of the 8 transmission weights.

When weights are selected among the total of (N×$n_T$) weights such that a sum of transmission rates of sub-data streams to be simultaneously transmitted is maximized, a probability in which the selected weights belong to the same weight set is high. When a hierarchical expression scheme is used to select one weight set and express weights selected from an associated weight set, an amount of feedback information for expressing the selected weights in which a data transmission rate is maximized can be minimized.

Examples of satisfying Equation (1) with respect to the number of transmit antennas, $n_T$, and N weight sets in the exemplary system of the present invention are shown in Tables 1 to 12. In the following tables, (x, y) denotes a complex number in which a real component is x and an imaginary component is y. That is, (x, y)=x+yi.

TABLE 1

Number of Transmit Antennas [$n_T$]: 2, Number of Weight Sets [N]: 1

| Set | Weight 1 | Weight 2 |
|---|---|---|
| 1 | (0.7071, 0.0000) | (0.7071, 0.0000) |
|   | (0.7071, 0.0000) | (−0.7071, 0.0000) |

TABLE 2

Number of Transmit Antennas [$n_T$]: 2, Number of Weight Sets [N]: 2

| Set | Weight 1 | Weight 2 |
|---|---|---|
| 1 | (0.7071, 0.0000) | (0.7071, 0.0000) |
|   | (0.7071, 0.0000) | (−0.7071, 0.0000) |
| 2 | (0.7071, 0.0000) | (0.7071, 0.0000) |
|   | (0.0000, 0.7071) | (0.0000, −0.7071) |

TABLE 3

Number of Transmit Antennas [$n_T$]: 2, Number of Weight Sets [N]: 3

| Set | Weight 1 | Weight 2 |
|---|---|---|
| 1 | (0.7071, 0.0000) | (0.7071, 0.0000) |
|   | (0.7071, 0.0000) | (−0.7071, 0.0000) |
| 2 | (0.7071, 0.0000) | (0.7071, 0.0000) |
|   | (0.3536, 0.6124) | (−0.3536, −0.6124) |

TABLE 3-continued

Number of Transmit Antennas [$n_T$]: 2, Number of Weight Sets [N]: 3

| Set | Weight 1 | Weight 2 |
|---|---|---|
| 3 | (0.7071, 0.0000)<br>(−0.3536, 0.6124) | (0.7071, 0.0000)<br>(0.3536, −0.6124) |

TABLE 4

Number of Transmit Antennas [$n_T$]: 2, Number of Weight Sets [N]: 4

| Set | Weight 1 | Weight 2 |
|---|---|---|
| 1 | (0.7071, 0.0000)<br>(0.7071, 0.0000) | (0.7071, 0.0000)<br>(−0.7071, 0.0000) |
| 2 | (0.7071, 0.0000)<br>(0.5000, 0.5000) | (0.7071, 0.0000)<br>(−0.5000, −0.5000) |
| 3 | (0.7071, 0.0000)<br>(0.0000, 0.7071) | (0.7071, 0.0000)<br>(0.0000, −0.7071) |
| 4 | (0.7071, 0.0000)<br>(−0.5000, 0.5000) | (0.7071, 0.0000)<br>(0.5000, −0.5000) |

TABLE 5

Number of Transmit Antennas [$n_T$]: 3, Number of Weight Sets [N]: 1

| Set | Weight 1 | Weight 2 | Weight 3 |
|---|---|---|---|
| 1 | (0.5774, 0.0000)<br>(0.5774, 0.0000)<br>(0.5774, 0.0000) | (0.5774, 0.0000)<br>(−0.2887, 0.5000)<br>(−0.2887, −0.5000) | (0.5774, 0.0000)<br>(−0.2887, −0.5000)<br>(−0.2887, 0.5000) |

TABLE 6

Number of Transmit Antennas [$n_T$]: 3, Number of Weight Sets [N]: 2

| Set | Weight 1 | Weight 2 | Weight 3 |
|---|---|---|---|
| 1 | (0.5774, 0.0000)<br>(0.5774, 0.0000)<br>(0.5774, 0.0000) | (0.5774, 0.0000)<br>(−0.2887, 0.5000)<br>(−0.2887, −0.5000) | (0.5774, 0.0000)<br>(−0.2887, −0.5000)<br>(−0.2887, 0.5000) |
| 2 | (0.5774, 0.0000)<br>(0.2887, 0.5000)<br>(−0.2887, 0.5000) | (0.5774, 0.0000)<br>(−0.5774, 0.0000)<br>(0.5774, 0.0000) | (0.5774, 0.0000)<br>(0.2887, −0.5000)<br>(−0.2887, −0.5000) |

TABLE 7

Number of Transmit Antennas [$n_T$]: 3, Number of Weight Sets [N]: 3

| Set | Weight 1 | Weight 2 | Weight 3 |
|---|---|---|---|
| 1 | (0.5774, 0.0000)<br>(0.5774, 0.0000)<br>(0.5774, 0.0000) | (0.5774, 0.0000)<br>(−0.2887, 0.5000)<br>(−0.2887, −0.5000) | (0.5774, 0.0000)<br>(−0.2887, −0.5000)<br>(−0.2887, 0.5000) |
| 2 | (0.5774, 0.0000)<br>(0.4423, 0.3711)<br>(0.1003, 0.5686) | (0.5774, 0.0000)<br>(−0.5425, 0.1975)<br>(0.4423, −0.3711) | (0.5774, 0.0000)<br>(0.1003, −0.5686)<br>(−0.5425, −0.1975) |
| 3 | (0.5774, 0.0000)<br>(0.1003, 0.5686)<br>(−0.5425, 0.1975) | (0.5774, 0.0000)<br>(−0.5774, −0.1975)<br>(0.4423, 0.3711) | (0.5774, 0.0000)<br>(0.4423, −0.3711)<br>(0.1003, −0.5686) |

TABLE 8

Number of Transmit Antennas [$n_T$]: 3, Number of Weight Sets [N]: 4

| Set | Weight 1 | Weight 2 | Weight 3 |
|---|---|---|---|
| 1 | (0.5774, 0.0000)<br>(0.5774, 0.0000)<br>(0.5774, 0.0000) | (0.5774, 0.0000)<br>(−0.2887, 0.5000)<br>(−0.2887, −0.5000) | (0.5774, 0.0000)<br>(−0.2887, −0.5000)<br>(−0.2887, 0.5000) |
| 2 | (0.5774, 0.0000)<br>(0.5000, 0.2887)<br>(0.2887, 0.5000) | (0.5774, 0.0000)<br>(−0.5000 0.2887)<br>(0.2887, −0.5000) | (0.5774, 0.0000)<br>(0.0000, −0.5774)<br>(−0.5774, 0.0000) |
| 3 | (0.5774, 0.0000)<br>(0.2887, 0.5000)<br>(−0.2887, 0.5000) | (0.5774, 0.0000)<br>(−0.5774, 0.0000)<br>(0.5774, 0.0000) | (0.5774, 0.0000)<br>(0.2887, −0.5000)<br>(−0.2887, −0.5000) |
| 4 | (0.5774, 0.0000)<br>(0.0000, 0.5774)<br>(−0.5774, 0.0000) | (0.5774, 0.0000)<br>(−0.5000, −0.2887)<br>(0.2887, 0.5000) | (0.5774, 0.0000)<br>(0.5000, −0.2887)<br>(0.2887, −0.5000) |

TABLE 9

Number of Transmit Antennas [$n_T$]: 4, Number of Weight Sets [N]: 1

| Set | Weight 1 | Weight 2 | Weight 3 | Weight 4 |
|---|---|---|---|---|
| 1 | (0.5000, 0.0000)<br>(0.5000, 0.0000)<br>(0.5000, 0.0000)<br>(0.5000, 0.0000) | (0.5000, 0.0000)<br>(0.0000, 0.5000)<br>(−0.5000, 0.0000)<br>(0.0000, −0.5000) | (0.5000, 0.0000)<br>(−0.5000, 0.0000)<br>(0.5000, 0.0000)<br>(−0.5000, 0.0000) | (0.5000, 0.0000)<br>(0.0000, −0.5000)<br>(−0.5000, 0.0000)<br>(0.0000, 0.5000) |

TABLE 10

Number of Transmit Antennas [$n_T$]: 4, Number of Weight Sets [N]: 2

| Set | Weight 1 | Weight 2 | Weight 3 | Weight 4 |
|---|---|---|---|---|
| 1 | (0.5000, 0.0000)<br>(0.5000, 0.0000)<br>(0.5000, 0.0000)<br>(0.5000, 0.0000) | (0.5000, 0.0000)<br>(0.0000, 0.5000)<br>(−0.5000, 0.0000)<br>(0.0000, −0.5000) | (0.5000, 0.0000)<br>(−0.5000, 0.0000)<br>(0.5000, 0.0000)<br>(−0.5000, 0.0000) | (0.5000, 0.0000)<br>(0.0000, −0.5000)<br>(−0.5000, 0.0000)<br>(0.0000, 0.5000) |
| 2 | (0.5000, 0.0000)<br>(0.3536, 0.3536)<br>(0.5000, 0.5000)<br>(−0.3536, 0.3536) | (0.5000, 0.0000)<br>(−0.3536, 0.3536)<br>(0.0000, −0.5000)<br>(0.3536, 0.3536) | (0.5000, 0.0000)<br>(−0.3536, −0.3536)<br>(0.0000, 0.5000)<br>(0.3536, −0.3536) | (0.5000, 0.0000)<br>(0.3536, −0.3536)<br>(0.0000, −0.5000)<br>(−0.3536, −0.3536) |

TABLE 11

Number of Transmit Antennas [$n_T$]: 4, Number of Weight Sets [N]: 3

| Set | Weight 1 | Weight 2 | Weight 3 | Weight 4 |
|---|---|---|---|---|
| 1 | (0.5000, 0.0000) | (0.5000, 0.0000) | (0.5000, 0.0000) | (0.5000, 0.0000) |
|   | (0.5000, 0.0000) | (0.0000, 0.5000) | (−0.5000, 0.0000) | (0.0000, −0.5000) |
|   | (0.5000, 0.0000) | (−0.5000, 0.0000) | (0.5000, 0.0000) | (−0.5000, 0.0000) |
|   | (0.5000, 0.0000) | (0.0000, −0.5000) | (−0.5000, 0.0000) | (0.0000, 0.5000) |
| 2 | (0.5000, 0.0000) | (0.5000, 0.0000) | (0.5000, 0.0000) | (0.5000, 0.0000) |
|   | (0.4330, 0.2500) | (−0.2500, 0.4330) | (−0.4330, −0.2500) | (0.2500, −0.4330) |
|   | (0.2500, 0.4330) | (−0.2500, −0.4330) | (0.2500, 0.4330) | −0.2500, −0.4330) |
|   | (0.0000, 0.5000) | (0.5000, 0.0000) | (0.0000, −0.5000) | (−0.5000, 0.0000) |
| 3 | (0.5000, 0.0000) | (0.5000, 0.0000) | (0.5000, 0.0000) | (0.5000, 0.0000) |
|   | (0.2500, 0.4330) | (−0.4330, 0.2500) | (−0.2500, −0.4330) | (0.4330, −0.2500) |
|   | (−0.2500, 0.4330) | (0.2500, −0.4330) | (−0.2500, 0.4330) | (0.2500, −0.4330) |
|   | (−0.5000, 0.0000) | (0.0000, 0.5000) | (0.5000, 0.0000) | (0.0000, −0.5000) |

TABLE 12

Number of Transmit Antennas [$n_T$]: 4, Number of Weight Sets [N]: 4

| Set | Weight 1 | Weight 2 | Weight 3 | Weight 4 |
|---|---|---|---|---|
| 1 | (0.5000, 0.0000) | (0.5000, 0.0000) | (0.5000, 0.0000) | (0.5000, 0.0000) |
|   | (0.5000, 0.0000) | (0.0000, 0.5000) | (−0.5000, 0.0000) | (0.0000, −0.5000) |
|   | (0.5000, 0.0000) | (−0.5000, 0.0000) | (0.5000, 0.0000) | (−0.5000, 0.0000) |
|   | (0.5000, 0.0000) | (0.0000, −0.5000) | (−0.5000, 0.0000) | (0.0000, 0.5000) |
| 2 | (0.5000, 0.0000) | (0.5000, 0.0000) | (0.5000, 0.0000) | (0.5000, 0.0000) |
|   | (0.4619, 0.1913) | (−0.1913, 0.4619) | (−0.4619, −0.1913) | (0.1913, −0.4619) |
|   | (0.3536, 0.3536) | (−0.3536, −0.3536) | (0.3536, 0.3536) | (−0.3536, −0.3536) |
|   | (0.1913, 0.4619) | (0.4619, −0.1913) | (−0.1913, −0.4619) | (−0.4619, 0.1913) |
| 3 | (0.5000, 0.0000) | (0.5000, 0.0000) | (0.5000, 0.0000) | (0.5000, 0.0000) |
|   | (0.3536, 0.3536) | (−0.3536, 0.3536) | (−0.3536, −0.3536) | (0.3536, −0.3536) |
|   | (0.0000, 0.5000) | (0.0000, −0.5000) | (0.0000, 0.5000) | (0.0000, −0.5000) |
|   | (−0.3536, 0.3536) | (0.3536, 0.3536) | (0.3536, −0.3536) | (−0.3536, −0.3536) |
| 4 | (0.5000, 0.0000) | (0.5000, 0.0000) | (0.5000, 0.0000) | (0.5000, 0.0000) |
|   | (0.1913, 0.4619) | (−0.4619, 0.1913) | (−0.1913, −0.4619) | (0.4619, −0.1913) |
|   | (−0.3536, 0.3536) | (0.3536, −0.3536) | (−0.3536, 0.3536) | (0.3536, −0.3536) |
|   | (−0.4619, −0.1913) | (−0.1913, 0.4619) | (0.4619, 0.1913) | (0.1913, −0.4619) |

2. Second Exemplary Embodiment

A scheme for feeding back weight selection information using a feedback channel for state information of sub-data streams.

Information for indicating weights selected from one weight set can be fed back in the following two schemes.

The first scheme uses a dedicated feedback channel for transferring only information about weights selected from one weight set as in the first exemplary embodiment of the present invention. This scheme uses 1-bit feedback information for each weight to indicate selection or non-selection of each weight belonging to the selected weight set. An amount of precode feedback information is a total of $\lfloor \log_2 N \rfloor + n_T$ bits/use including feedback information for transmitting an index of the selected weight set. To adjust transmission data rates of respective data streams to be transmitted, channel state information of the respective data streams formed by the selected weights is to be additionally fed back. When the dedicated feedback channel is used to transfer weight selection information, channel state information of sub-data streams relative to unselected weights does not need to be fed back.

The second scheme is a feedback scheme for transferring weight selection information in accordance with the second exemplary embodiment of the present invention. To adjust transmission data rates of respective data streams to be transmitted, the scheme uses a feedback channel for channel state information of the respective data streams in a system for feeding back channel state information of respective sub-data streams from the receiver to the transmitter.

Figure 6:
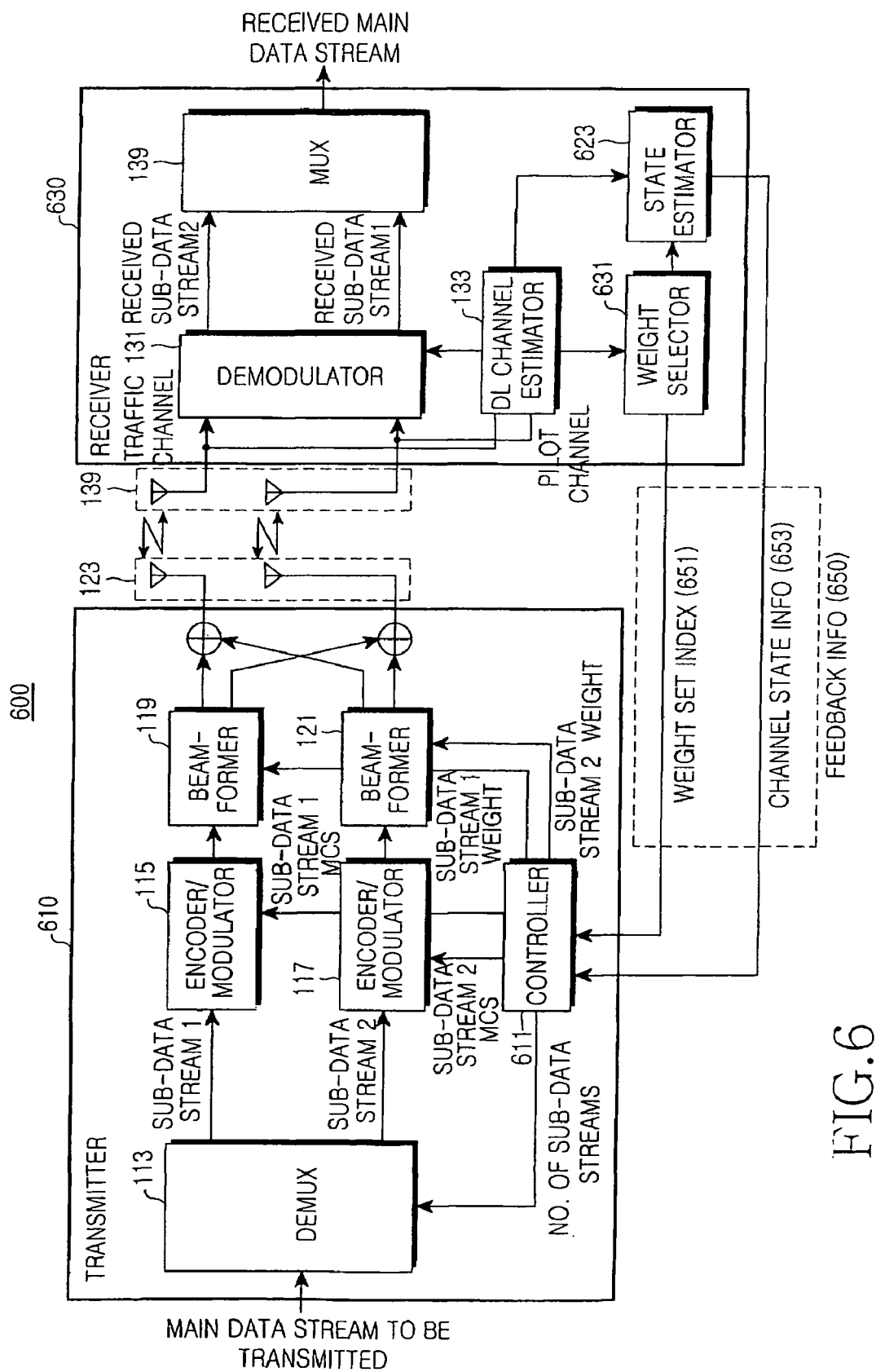
FIG. 6 illustrates a system in accordance with a second exemplary embodiment of the present invention.

FIG. 6 illustrates a knockdown precoding system 600 in accordance with the second exemplary embodiment of the present invention. The same components between the first and second exemplary embodiments are denoted by the same reference numerals. Only differences between the first and second exemplary embodiments will be described, but parts for performing the same functions are omitted or will be briefly described.

The second exemplary embodiment will be briefly described with reference to FIG. 6. A weight selector 631 of the system 600 of the exemplary embodiment selects weights relative to the maximum data transmission rate using fading channel information estimated in the downlink channel estimator 133 and transfers weight vectors selected from an associated weight set to a subchannel-by-subchannel state estimator 623. The subchannel-by-subchannel state estimator 623 computes and quantizes SINRs of sub-data streams formed by the weight selector 631, and decides channel state information 653 of sub-data streams, in other words a Channel Quality Indicator (CQI) or MCS. Herein, a combination of various modulation schemes and coding rates is possible in the channel state information 653 of the sub-data streams. This example can be shown in Table 13.

TABLE 13

| Coding Rate | Modulation Scheme |
| --- | --- |
| ½ | QPSK |
| | 8PSK |
| | 16QAM |
| | 64QAM |
| ¼ | QPSK |
| | 8PSK |
| | 16QAM |
| | 64QAM |

To feed back information about weights selected from one weight set in this exemplary embodiment, a "No Transmission" level is added to indicate that an associated weight has not been used in the existing MCS or CQI level. That is, when an associated weight has not been selected for transmission, the "No Transmission" level is fed back through the state information 653 of the respective sub-data streams.

A controller 611 of the transmitter 610 receives feedback information 650 including weight set index information 651 and state information 653 of respective sub-data streams. The controller 611 decides the number of sub-data streams capable of being simultaneously transmitted using the state information 653 of the respective data streams and notifies a demultiplexer 113 of the decided number. Moreover, the controller 611 decides a coding rate, a modulation scheme, and an associated weight of each sub-data stream using the feedback information 650, and notifies channel encoders/modulators 115 and 117 and beamformers 119 and 121 of decision results.

An exemplary method for transmitting and receiver data in the transmitter and the receiver of the system 600 of the present invention will be described in detail with reference to FIGS. 7 and 8.

Figure 7:
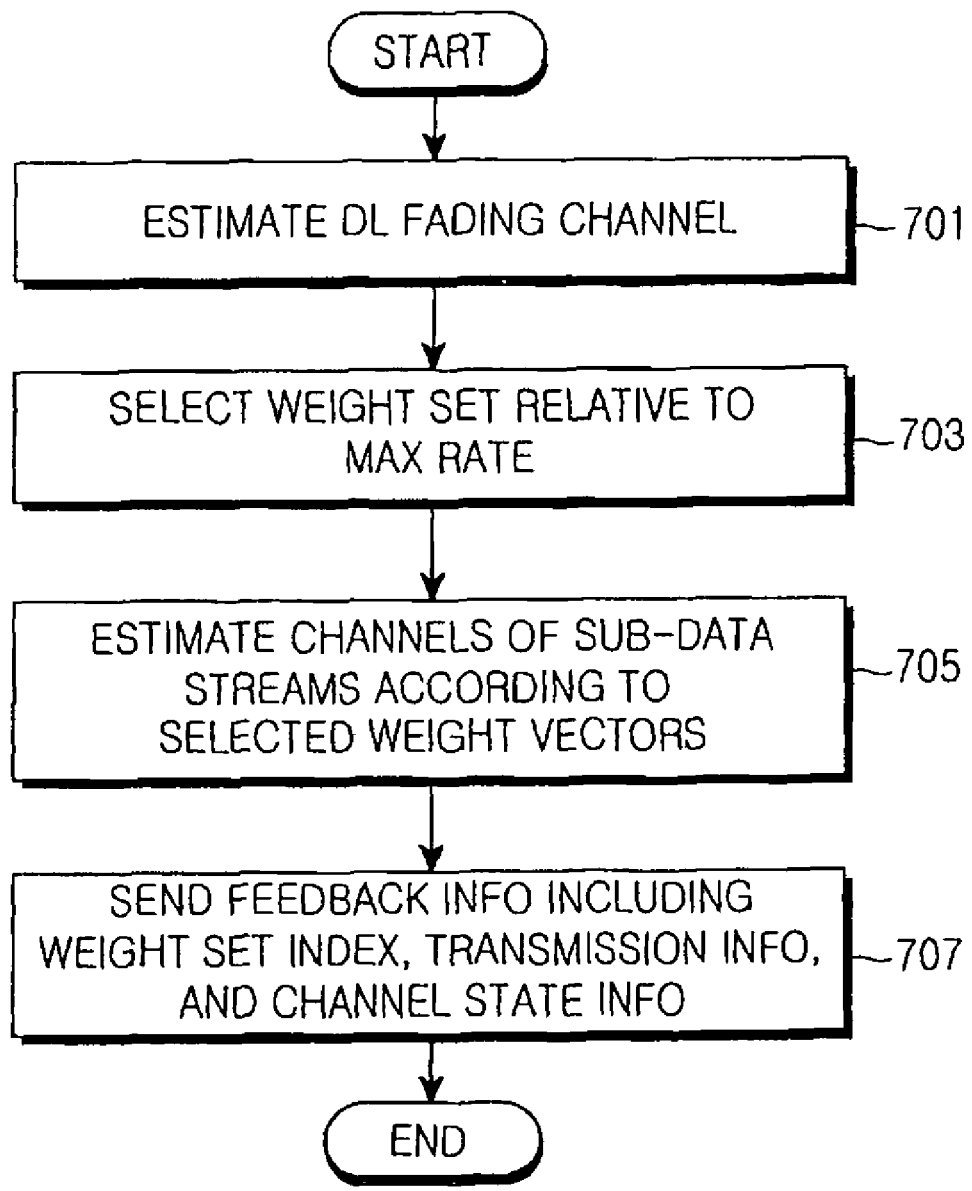
FIG. 7 is a flowchart illustrating a method for transmitting/receiving data in a receiver of the system in accordance with the second exemplary embodiment of the present invention.

FIG. 7 is a flowchart illustrating a method for transmitting/receiving data in the receiver 630 of the system 600 in accordance with the second exemplary embodiment of the present invention.

Referring to FIG. 7, a downlink channel estimator 133 of the receiver 630 estimates a downlink fading channel using a pilot channel or symbol received from a plurality of receive antennas in step 701. That is, the downlink fading channel from each transmit antenna to each receive antenna is estimated. Subsequently, the weight selector 631 decides a weight set relative to a maximum data transmission rate and weight vectors selected from an associated weight set in step 703. The subchannel-by-subchannel state estimator 623 is notified of decision information. The subchannel-by-subchannel state estimator 623 estimates channel states of the respective sub-data streams according to the decided weight vectors in step 705. That is, the subchannel-by-subchannel state estimator 623 computes SINRs of sub-data streams formed by the selected weights, and decides channel state information 653 of the respective sub-data streams. In step 707, the receiver 630 transmits feedback information 650 including a weight set index 651, transmission information, and the channel state information of the respective sub-data streams.

Next, step 707 will be described in detail. State information of weights unselected in step 703 is set to a "No Transmission" level, and state information of all weights belonging to a selected weight set is fed back to the transmitter 610. Accordingly, only a feedback channel for transferring the selected weight set index information 651 and a feedback channel for transferring the channel state information 653 of the respective sub-data streams formed by estimated selected weights are required. Herein, the weight set index 651 and the state information 653 of the respective sub-data streams can be simultaneously or separately transmitted.

Figure 8:
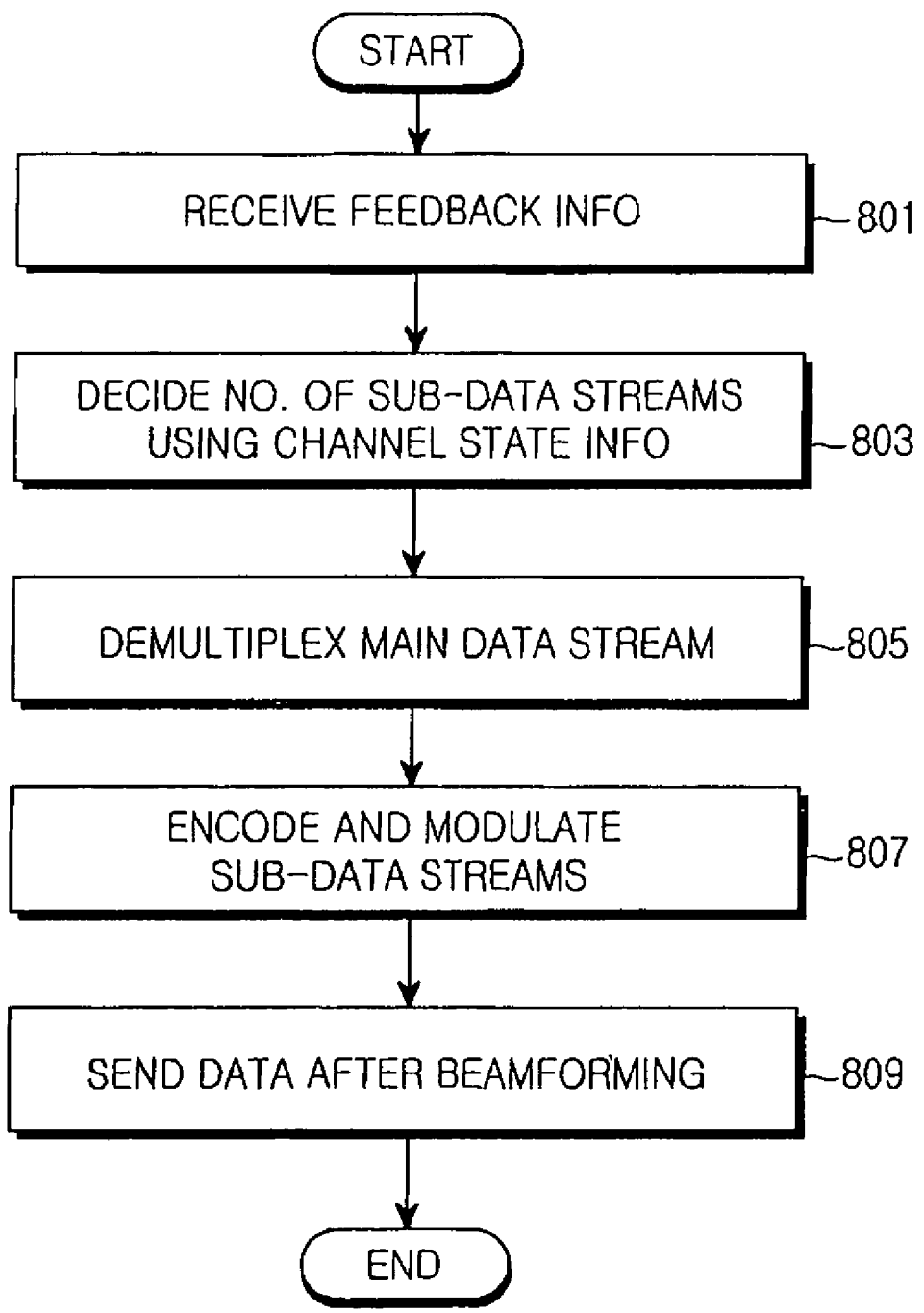
FIG. 8 is a flowchart illustrating a method for transmitting/receiving data in a transmitter of the system in accordance with the second exemplary embodiment of the present invention.

FIG. 8 is a flowchart illustrating a method for transmitting/receiving data in the transmitter 610 of the system 600 in accordance with the second exemplary embodiment of the present invention.

Referring to FIG. 8, the transmitter 610 receives feedback information 650 from the receiver 630 in step 801. Subsequently, the controller 611 sets the number of sub-data streams capable of being finally transmitted using channel state information 653 of the respective sub-data streams in step 803. Because a channel to be unused is set to a "No Transmission" level, the controller 611 can know the channel state information 653 of the respective sub-data streams. The demultiplexer 113 demultiplexes a main data stream to be transmitted into sub-data streams capable of being transmitted in step 805. Using a coding rate and a modulation scheme, the channel encoders/modulators 115 and 117 independently performs encoding and symbol mapping processes for the sub-data streams in step 807. Subsequently, the beamformers 119 and 121 multiply the sub-data streams by weights, perform a beamforming process, and transmit the encoded and modulated sub-data streams to the receiver 630 in step 809. The transmitter 610 can know the weights because selection information of the weights belonging to an associated weight set is included in the channel state information 653 of the respective sub-data streams.

Because MCS information relative to weights unused for an actual transmission must be also fed back, a total amount of precode and MCS feedback information is considered. The second exemplary embodiment requires a smaller amount of feedback information than the first exemplary embodiment only when the number of weights to be used for the actual transmission is less than ((½ of Total Number of Transmit Antennas)+1). When the number of weights to be used for the actual transmission is more than ((½ of Total Number of Transmit Antennas)+1), a feedback channel for feeding back the channel state information of the respective sub-data streams is used to transmit the feedback information. In other cases, feedback in which two schemes are combined can be performed with a dedicated feedback channel for transferring only weight selection information.

3. Third Exemplary Embodiment

Open-Loop Knockdown Precoding Technology

The proposed knockdown precoding technology can operate as open-loop knockdown precoding technology and closed-loop knockdown precoding technology according to the presence of a feedback channel for transferring selected weight set index information.

The closed-loop knockdown precoding technology in the above-described first and second exemplary embodiments corresponds to the case where index information of a selected common weight set is fed back. According to a feedback scheme for transferring weight selection information, the structures and operations of the transmitter and the receiver of the open-loop knockdown precoding system in the third exemplary embodiment are the same as those of the knockdown precoding system 100 using the dedicated feedback channel of FIG. 1 or the knockdown precoding system 600 using a feedback channel for feeding back the subchannel-by-subchannel state information in FIG. 6.

In the third exemplary embodiment, a feedback channel for transferring an index of a selected weight set is absent but a feedback channel for transferring information about selected weights is present. When the number of transmit antennas is two, the knockdown precoding system structure of the open-loop scheme is the same as those of FIGS. 1 and 6.

A system 900 in accordance with the third exemplary embodiment of the present invention will be described with reference to FIG. 9. In the third exemplary embodiment, a description of the same parts as those of the first and second exemplary embodiments is omitted or will be briefly given.

Figure 9:
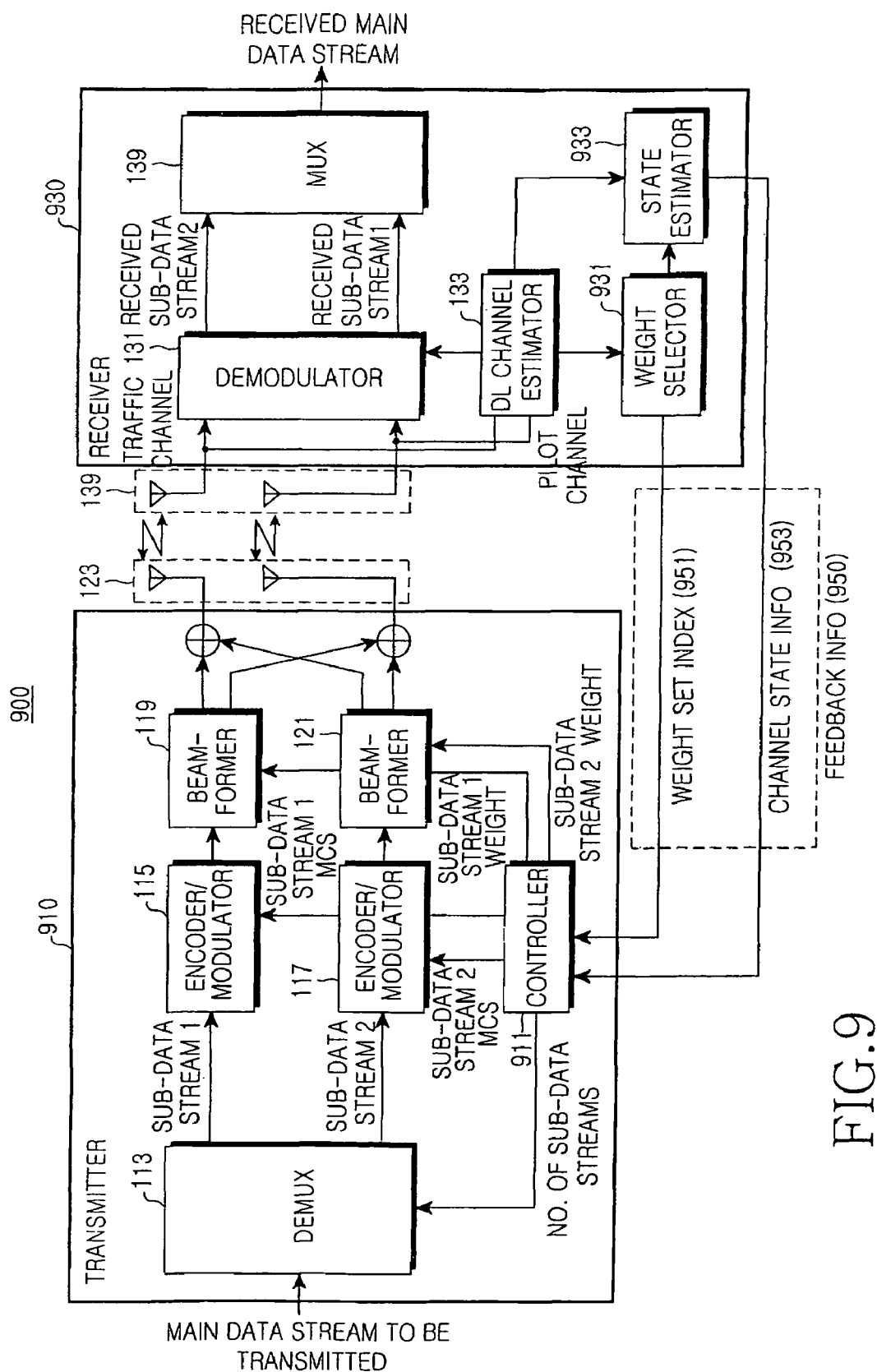
FIG. 9 illustrates a system in accordance with a third exemplary embodiment of the present invention.

Referring to FIG. 9, the system 900 of the third exemplary embodiment is almost the same as that of the above-described closed-loop knockdown precoding technology. A difference is that a feedback channel for a selected common weight set index is absent in the system 900. Because the feedback channel for the selected common weight set index is absent, a transmitter 910 and receivers 930 within a cell use only one weight set in one time slot. A weight set to be used is not fixed, and N weight sets are sequentially and periodically used. That is, the weight sets may be used in order of $E_1, E_2, E_3, \ldots, E_N$, $E_1$. A weight set to be used varies with a defined period and order. Accordingly, the controller 911 controls demultiplexing, encoding, modulation, and beamforming processes for a main data stream using selected weight vector information 951 and state information 953 of respective sub-data streams. Because a data processing method of the transmitter 910 is the same as those of the above-described exemplary embodiments, its description is omitted herein.

When a weight set in a predetermined time slot is known, the weight selector 931 selects weight vectors from the weight set and feeds back weight vector information 951. The subchannel-by-subchannel state estimator 933 detects the selected weight vectors from the weight selector 931 and notifies the transmitter 910 of the state information 953 of the sub-data streams.

A method for transmitting/receiving data in the system 900 of the third exemplary embodiment will be described with reference to FIGS. 10 and 11.

Figure 10:
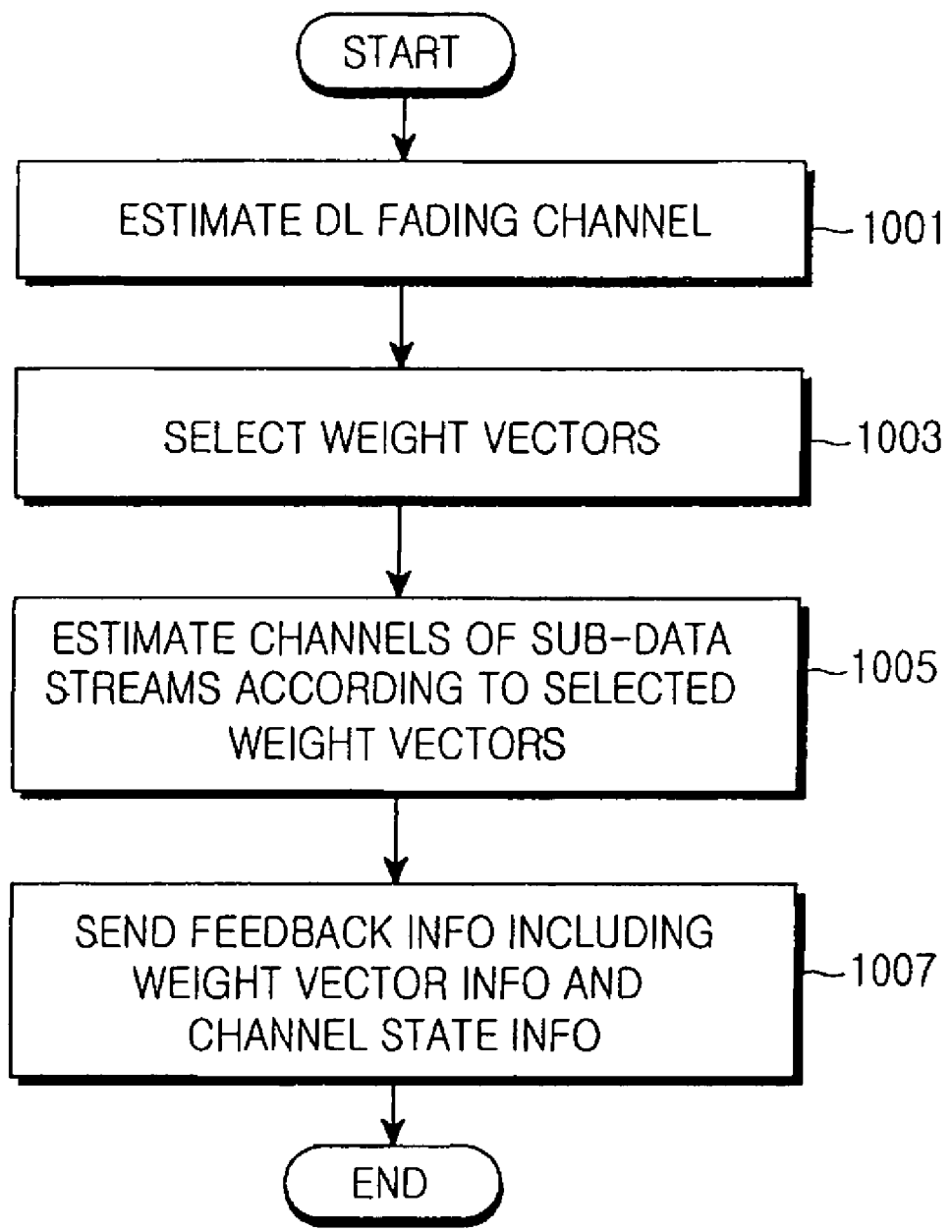
FIG. 10 is a flowchart illustrating a method for transmitting/receiving data in a receiver of the system in accordance with the third exemplary embodiment of the present invention.

FIG. 10 is a flowchart illustrating a method for transmitting/receiving data in a receiver 930 of the system 900 in accordance with the third exemplary embodiment of the present invention.

Referring to FIG. 10, a downlink channel estimator 133 estimates a fading channel from each transmit antenna to each receive antenna using a pilot channel or symbol received from a plurality of receive antennas 139 in step 1001. Subsequently, the weight selector 931 selects weight vector information 951 to be actually transmitted because a weight set is known in a time period in step 1003. The subchannel-by-subchannel state estimator 933 estimates channel states of respective sub-data streams according to the selected weight vectors in step 1005. Subsequently, the receiver 930 transmits feedback information 950 including the weight vector information 951 and channel state information 953 of the respective sub-data streams to the transmitter 910 in step 1007.

Figure 11:
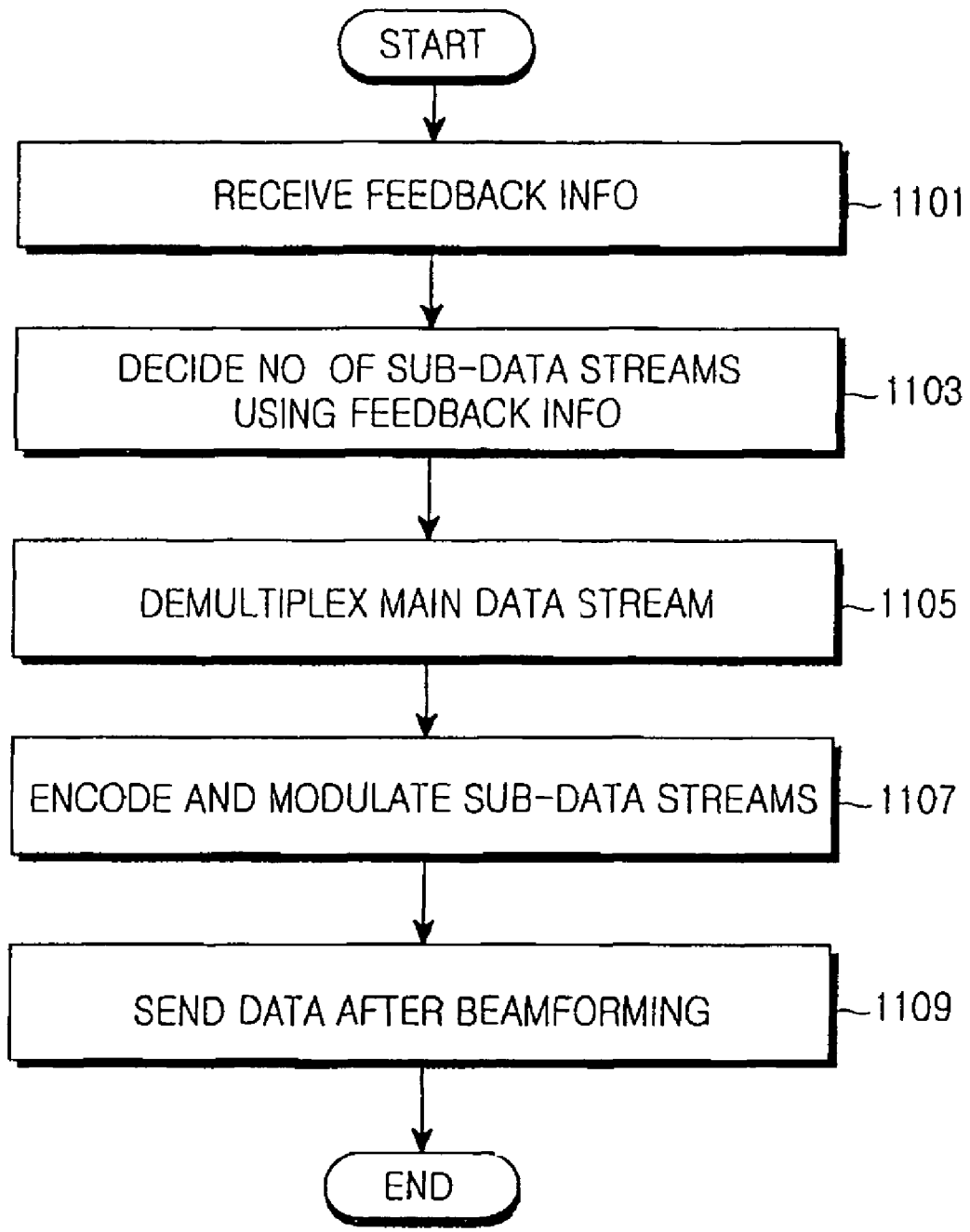
FIG. 11 is a flowchart illustrating a method for transmitting/receiving data in a transmitter of the system in accordance with the third exemplary embodiment of the present invention.

FIG. 11 is a flowchart illustrating a method for transmitting/receiving data in the transmitter 910 of the system 900 in accordance with the third exemplary embodiment of the present invention.

Referring to FIG. 11, the transmitter 910 decides the number of sub-data streams capable of being simultaneously transmitted using feedback information 950 in step 1103 when receiving the feedback information 950 in step 1101. Then, the demultiplexer 113 demultiplexes a main data stream to be transmitted into sub-data streams capable of being transmitted in step 1105. Using a coding rate and a modulation scheme, the channel encoders/modulators 115 and 117 independently perform encoding and symbol mapping processes for the sub-data streams in step 1107. Subsequently, the beamformers 119 and 121 multiply the sub-data streams by weights, perform a beamforming process, and transmit the encoded and modulated sub-data streams to the receiver in step 1109.

In the open-loop scheme of the system 900 of the third exemplary embodiment, a channel for feeding back a selected weight set index is absent and one weight set is only used in one time slot. A transmission data rate of the open-loop scheme is lower than the closed-loop scheme of the first and second exemplary embodiments. However, because an amount of feedback information of the open-loop scheme is less than that of the closed-loop scheme, the open-loop scheme is applied to a system in which an amount of feedback information to be transmitted is limited, such that a transmission data rate in the precoding scheme is improved.

Comparison and Analysis Between the Proposed Technology and the Conventional Technology The conventional precoder codebook technology and the proposed knockdown precoding technology are compared and analyzed in terms of a scheme for adjusting the number of data streams to be simultaneously transmitted and an amount of feedback information required therefor.

In the conventional precoder codebook technology, a precoder codebook is separately defined and used according to the number of transmit antennas, $n_T$, the number of receive antennas, $n_R$, and the number of data streams to be simultaneously transmitted, $n_S$. When the number of data streams to be simultaneously transmitted is adjusted according to a channel state of each transmitter/receiver in a state in which the transmitter with four transmit antennas communicates with receivers in which the number of receive antennas is one, two, three, and four, the number of precoder codebooks to be considered is 10, in other words $(n_T, n_R, n_S)$=(4, 1, 1), =(4, 1, 1), (4, 2, 1), (4, 2, 2), (4, 3, 1), (4, 3, 2), (4, 3, 3), (4, 4, 1), (4, 4, 2), (4, 4, 3), and (4, 4, 4). The 10 precoder-codebooks are defined between the transmitter and the receivers. The receiver feeds back the number of receive antennas, $n_R$, and the number of data streams, $n_S$, to the transmitter, such that the transmitter selects a precoder codebook to be used. The receiver selects a precode for a transmission at the maximum capacity in a precoder codebook suitable for the number of receive antennas, $n_R$, and the number of data streams, $n_S$, and feeds back an index of the selected precode to the transmitter. The transmitter selects a precode with the feedback index in the precoder codebook suitable for the fed-back $n_R$ and $n_S$ and transmits data.

Because $n_R$ can be fed back only once, an amount of required feedback information for $n_R$ is small and negligible. Feedback information for $n_S$ instantaneously varying with a channel state is to be transmitted along with feedback information of an index of a selected precode. Assuming that each precoder codebook is constructed by 8 precodes, 2 bits/use for feedback information of $n_S$ and 3 bits/use for feedback information of the selected precode index are required, such that a total of 5 bits/use for feedback information are required.

An optimal precoder codebook differs according to a spatial correlation of fading in an operating channel. Up to now, a precoder codebook has been designed under the assumption that a spatial correlation of fading is absent in the conventional precoder codebook technology. Accordingly, performance degradation occurs in a channel environment in which a spatial correlation of fading is present. To overcome the performance degradation, the transmitter is to perform a companding process for an existing precoder codebook using a spatial correlation matrix of a downlink channel. For this, because the receiver estimates the spatial correlation matrix of the downlink channel and feeds back the estimated matrix to the transmitter, an additional amount of feedback information for feeding back a spatial correlation matrix of a downlink channel as well as an amount of feedback information for feeding back $n_S$ and a selected index is required.

In the knockdown precoding technology proposed in the present invention, N weight sets constructed by orthogonal weights whose number corresponds to the number of transmit antennas, $n_T$, are defined. The receiver considers the number of used receive antennas, $n_R$, and selects a maximum of min $(n_T, n_R)$ weights relative to the maximum transmission rate. The receiver feeds back the selected weights to the transmitter through feedback information of a selected weight set index and weights selected from the associated set. The transmitter transmits multiple data streams using weights selected from the weight set based on the feedback information. Because N weight sets configured by a total of $N \cdot n_T$ weights are commonly used even though receive antennas of receivers are various and the number of data streams to be simultaneously transmitted is various, an amount of information about weight sets to be defined between the transmitter and the receivers is significantly smaller than an amount of information required in the precoder codebook scheme. Specifically, because the number of precoder codebooks to be considered significantly increases when the number of transmit antennas exceeds four, an amount of information about the precoder codebooks to be defined between the transmitter and the receivers significantly increases. In contrast, in the proposed knockdown precoding scheme, an amount of information about weight sets to be defined between the transmitter and the receivers almost does not increase because the number of weight sets, N, decreases even when the number of transmit antennas, $n_T$, increases. This is because the performance of the knockdown precoding technology depends on the number of weights, $N \cdot n_T$.

An amount of feedback information required in the closed-loop knockdown precoding technology using a dedicated feedback channel for weight selection information feedback is $\lfloor \log_2 N \rfloor$ bits/use for feeding back a selected weight set index and $n_T$ bits/use for feeding back weight selection information, such that a total of $\lfloor \log_2 N \rfloor + n_T$ bits/use are required. When the number of transmit antennas is 4 and N=2, a total of 5 bits/use are required. An amount of feedback information required in the open-loop knockdown precoding technology using a dedicated feedback channel for feeding back weight selection information is only $n_T$ bits/use for feeding back weight selection information. To reduce an amount of feedback information required for weight selection information, a scheme for feeding back weight selection information using a feedback channel for transmitting channel state information of respective sub-data streams can be used.

A feedback scheme can be selected to transmit weight selection information according to an uplink channel structure of a system to which the proposed knockdown precoding technology is applied. The number of weight sets to be used can be adjusted and applied according to uplink channel capacity available in the system. Specially, when the uplink channel capacity available in the system is very small, the open knockdown precoding technology can be applied.

Figure 12:
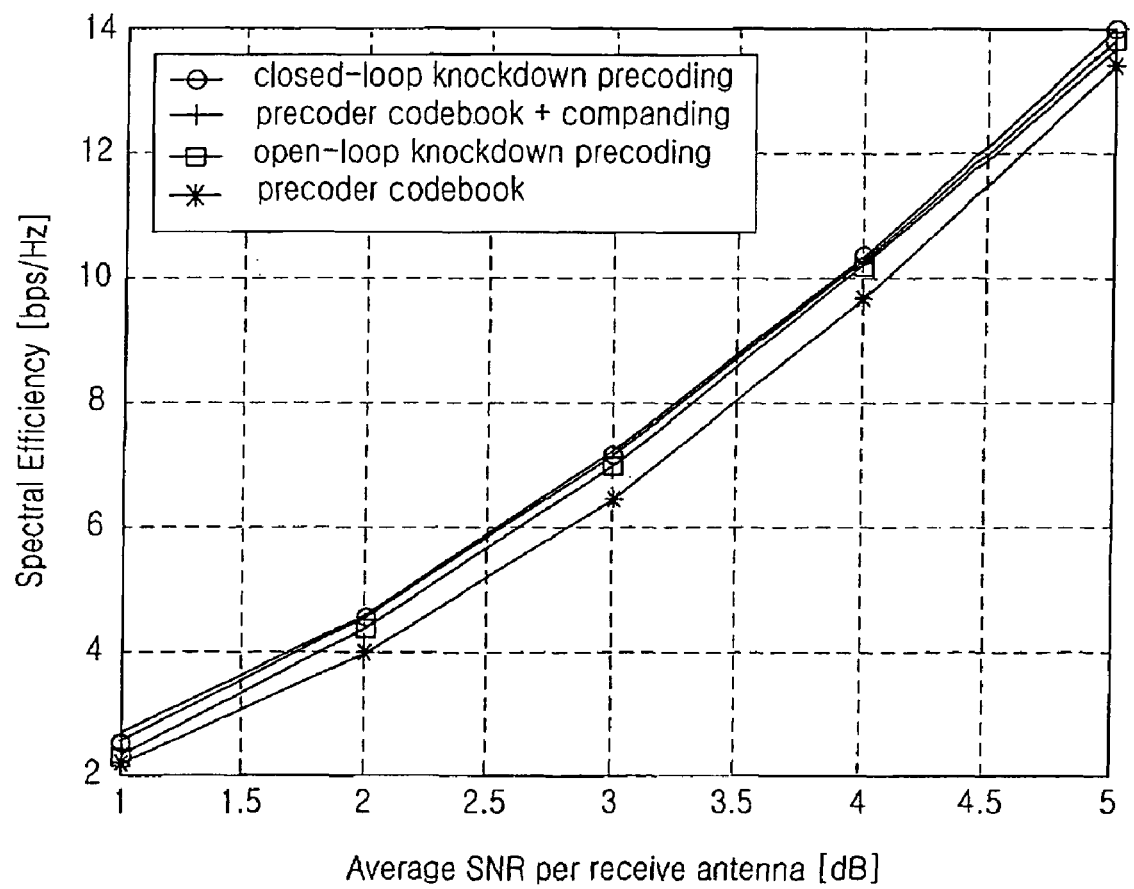
FIG. 12 is a graph illustrating simulation results of a system performance comparison between the conventional technology and the proposed system in an environment in which a spatial correlation is present.

FIG. 12 illustrates performance comparison results of a Minimum Mean Square Error-Ordered Successive Interference Cancellation (MMSE-OSIC) system using the proposed knockdown precoding technology and the precoder codebook technology in an environment in which a spatial correlation is high when $n_T = n_R = 4$. When the knockdown precoding technology considers the case where two weight sets are used, the closed-loop knockdown precoding technology requires one bit for feedback of a weight set index and four bits for feedback of selection information of four weights, in other words a total of 5 bits/use. The open-loop knockdown precoding technology requires 4 bits/use for feedback of selection information of four weights. The precoder codebook technology requires 2 bits/use for adjusting the number of data streams to be simultaneously transmitted and 3 bits/use for feedback of a selected precode index, in other words an amount of feedback information of a total of 5 bits/use. When the performances of the closed-loop knockdown technology and the precoder codebook technology without companding requiring the same amount of feedback information are compared, it can be seen that the closed-loop knockdown precoding technology outperforms the precoder codebook technology without companding. In addition, it can be seen that the open-loop knockdown precoding technology requiring 4 bits/use outperforms the precoder codebook technology requiring 5 bits/use without companding. The precoder codebook technology with companding has a performance similar to that of the closed-loop knockdown precoding technology. Because additional feedback for a spatial correlation matrix of a downlink channel for companding is required, its amount of required feedback information is significantly larger than that of the closed-loop knockdown precoding technology.

From the simulation results, it can be seen that the proposed knockdown precoding technology is more easily applied to a channel environment with various spatial correlations and has more excellent performance in comparison with the conventional precoder codebook technology.

Figure 13:
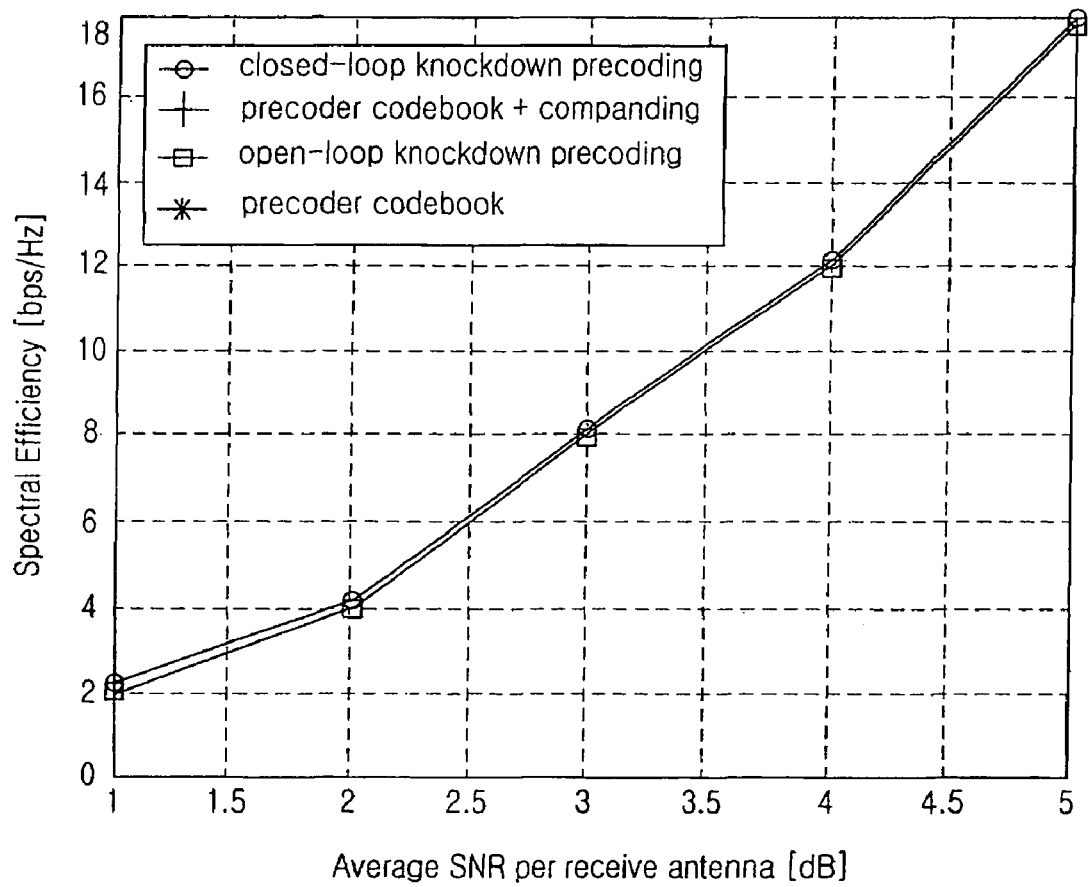
FIG. 13 is a graph illustrating simulation results of a system performance comparison between the conventional technology and the proposed system in an environment in which a spatial correlation is absent.

FIG. 13 illustrates performance comparison results of a MMSE-OSIC system using the proposed knockdown precoding technology and the precoder codebook technology in an environment in which a spatial correlation is absent when $n_T = n_R = 4$.

Referring to FIG. 13, the precoder codebook technology with companding has the same performance as the precoder codebook technology without companding in an uncorrelated environment, because a transmission correlation matrix is an identity matrix in the uncorrelated environment and a precoder codebook is not varied even though companding is performed. The two precoder-codebook technologies have the same performance as the closed-loop knockdown precoding technology and slightly outperform the open-loop knockdown precoding technology. From the performance results of FIGS. 12 and 13, it can be seen that the proposed precoder codebook technology has performance similar to that of the conventional technology in the uncorrelated environment and outperforms the conventional technology in a channel environment with various spatial correlations.

As described above, the knockdown precoding technology of the present invention can be more easily applied to a channel environment with various spatial correlations and can have more excellent performance and higher throughput in comparison with the conventional precoder codebook technology. The knockdown precoding technology requires a smaller memory size than the precoder codebook technology, and can be optimized according to an uplink channel structure and capacity of a system to which the spatial multiplexing technology is applied.

Although the exemplary embodiments of the present invention have been disclosed for illustrative purposes, those skilled in the art will appreciate that various modifications, additions, and substitutions are possible, without departing from the scope of the present invention. In the example of the present invention, the system in which the number of transmit antennas and the number of receive antennas are two has been described for convenience of explanation. Of course, at least three antennas can be applied. Therefore, the present invention is not limited to the above-described embodiments, but is defined by the following claims, along with their full scope of equivalents.

What is claimed is:

1. A method for configuring codebook for precoding to be used in a wireless communication system, the method comprising:
   setting weight vectors corresponding to the plurality of codebook indices in the codebook,
   wherein the weight vectors are equal to $$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix} \text{ and } \frac{1}{\sqrt{2}}\begin{bmatrix}1\\-j\end{bmatrix}$$

respectively when the number of data stream to be transmitted through two antennas is equal to 1.

2. The method of claim 1, wherein the weight vectors are equal to normalized $$\frac{1}{\sqrt{2}}\begin{bmatrix}1 & 1\\1 & -1\end{bmatrix} \text{ and } \frac{1}{\sqrt{2}}\begin{bmatrix}1 & 1\\j & -j\end{bmatrix}$$

respectively when the number of data stream to be transmitted through two antennas is equal to 2.

3. The method of claim 2, wherein the codebook index is determined by weight set index and weight vector information.

4. The method of claim 2, wherein the codebook is configured in a transmitter and a receiver.

5. The method of claim 2, wherein the weight vectors set in the codebook are orthogonal each other.

6. A computer readable medium containing codebook for precoding to be used in a wireless communication system:
   the codebook comprising weight vectors corresponding to the plurality of codebook indices,
   wherein the weight vectors are equal to $$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix} \text{ and } \frac{1}{\sqrt{2}}\begin{bmatrix}1\\-j\end{bmatrix}$$

respectively when the number of data stream to be transmitted through two antennas is equal to 1.

7. The method of claim 6, wherein the weight vectors are equal to normalized $$\frac{1}{\sqrt{2}}\begin{bmatrix}1 & 1\\1 & -1\end{bmatrix} \text{ and } \frac{1}{\sqrt{2}}\begin{bmatrix}1 & 1\\j & -j\end{bmatrix}$$

respectively when the number of data stream to be transmitted through two antennas is equal to 2.

8. The computer readable medium of claim 7, wherein the codebook index is determined by weight set index and weight vector information.

9. The computer readable medium of claim 7, wherein the codebook is configured in a transmitter and a receiver.

10. The computer readable medium of claim 7, wherein the weight vectors set in the codebook are orthogonal each other.

11. An apparatus for transmitting data using codebook in a wireless communication system, the apparatus comprising:
    a storage for storing a codebook comprising weight vectors corresponding to the plurality of codebook indices; and
    the transmitter for transmitting a data stream using the codebook stored in the storage;
    wherein the weight vectors are equal to $$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix} \text{ and } \frac{1}{\sqrt{2}}\begin{bmatrix}1\\-j\end{bmatrix}$$

respectively when the number of data stream to be transmitted through two antennas is equal to 1.

12. The apparatus of claim 11, wherein the weight vectors are equal to normalized $$\frac{1}{\sqrt{2}}\begin{bmatrix}1 & 1\\1 & -1\end{bmatrix} \text{ and } \frac{1}{\sqrt{2}}\begin{bmatrix}1 & 1\\j & -j\end{bmatrix}$$

respectively when the number of data stream to be transmitted through two antennas is equal to 2.

13. The apparatus of claim 12, wherein the codebook index is determined by weight set index and weight vector information.

14. The apparatus of claim 12, wherein the codebook is configured in a transmitter and a receiver.

15. The apparatus of claim 12, wherein the weight vectors set in the codebook are orthogonal each other.

16. An apparatus for receiving data in a wireless communication system, the apparatus comprising:
    a storage for storing a codebook comprising weight vectors corresponding to the plurality of codebook indices; and
    a receiver for receiving a data stream transmitted from a transmitter using the codebook stored in the storage;
    wherein the weight vectors are equal to $$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix} \text{ and } \frac{1}{\sqrt{2}}\begin{bmatrix}1\\-j\end{bmatrix}$$

respectively when the number of data stream to be transmitted through two antennas is equal to 1.

17. The apparatus of claim 16, wherein the weight vectors are equal to normalized $$\frac{1}{\sqrt{2}}\begin{bmatrix}1 & 1\\1 & -1\end{bmatrix} \text{ and } \frac{1}{\sqrt{2}}\begin{bmatrix}1 & 1\\j & -j\end{bmatrix}$$

respectively when the number of data stream to be transmitted through two antennas is equal to 2.

18. The apparatus of claim 17, wherein the codebook index is determined by weight set index and weight vector information.

19. The apparatus of claim 17, wherein the codebook is configured in a transmitter and a receiver.

20. The apparatus of claim 17, wherein the weight vectors set in the codebook are orthogonal each other.

* * * * *